United States Patent
Dado et al.

(10) Patent No.: US 9,587,106 B2
(45) Date of Patent: *Mar. 7, 2017

(54) METHOD OF SULFONATION OF BLOCK POLYMERS

(71) Applicant: Stepan Company, Northfield, IL (US)

(72) Inventors: Gregory Paul Dado, Chicago, IL (US); Dale Lee Handlin, Jr., Shelby, NC (US); Carl Lesley Willis, Houston, TX (US)

(73) Assignee: Stepan Company, Northfield, IL (US)

(*) Notice: Subject to any disclaimer, the term of this patent is extended or adjusted under 35 U.S.C. 154(b) by 68 days.

This patent is subject to a terminal disclaimer.

(21) Appl. No.: 14/486,604

(22) Filed: Sep. 15, 2014

(65) Prior Publication Data

US 2015/0005439 A1 Jan. 1, 2015

Related U.S. Application Data

(63) Continuation of application No. 12/498,778, filed on Jul. 7, 2009, now Pat. No. 8,835,562, which is a continuation of application No. PCT/US2008/051318, filed on Jan. 17, 2008.

(60) Provisional application No. 60/885,804, filed on Jan. 19, 2007.

(51) Int. Cl.
*C08F 8/36* (2006.01)
*C08L 53/02* (2006.01)
*C08G 81/02* (2006.01)

(52) U.S. Cl.
CPC .............. *C08L 53/025* (2013.01); *C08F 8/36* (2013.01); *C08G 81/022* (2013.01); *C08F 2800/20* (2013.01); *C08L 2201/56* (2013.01)

(58) Field of Classification Search
CPC ........ C08F 8/36; C08F 279/00; C08F 279/02; C08F 257/02; C08L 53/005; C08L 53/025; C08L 2201/56
USPC ........ 525/98, 314, 332.4, 332.9, 333.5, 343, 525/344, 353
See application file for complete search history.

(56) References Cited

U.S. PATENT DOCUMENTS

| | | | | |
|---|---|---|---|---|
| H818 H | * | 9/1990 | Wagensommer ....... | C08L 23/32 525/333.9 |
| 5,239,010 A | * | 8/1993 | Balas ....................... | C08F 8/36 525/314 |
| 5,288,773 A | * | 2/1994 | Gorbaty ................... | C08L 95/00 524/59 |
| 6,306,419 B1 | | 10/2001 | Vachon et al. | |
| 6,451,921 B2 | | 9/2002 | Weisse et al. | |
| 8,012,539 B2 | | 9/2011 | Handlin, Jr. et al. | |
| 8,835,562 B2 | * | 9/2014 | Dado ........................ | C08F 8/36 525/314 |
| 2003/0049511 A1 | | 3/2003 | Ritts et al. | |
| 2005/0137349 A1 | | 6/2005 | Bening et al. | |
| 2006/0014902 A1 | | 1/2006 | Mays et al. | |

FOREIGN PATENT DOCUMENTS

| | | |
|---|---|---|
| EP | 0071347 | 2/1983 |
| WO | 2005030812 | 4/2005 |
| WO | WO 2005/030812 A1 * | 4/2005 |

OTHER PUBLICATIONS

Thaler, W., Macromolecules 16 (1983) 623-628.*
Thaler, Warren A., Hydrocarbon-Soluble Sulfonating Reagents. Sulfonation of Aromatic Polymers in Hydrocarbon Solution Using Solugle Acyl Sulfates, Macromolecules 1983, 16, pp. 623-628.
International Search Report and Written Opinion for PCT Application No. PCT/US08/51318, dated May 22, 2008.
International Preliminary Report on Patentability for PCT Application No. PCT/US08/51318, mailed on Jul. 30, 2009.
Extended European search report for Application No. 08727838.8-1214 / 2106410 PCT/US2008051318, dated Nov. 27, 2009.
Communication for Application No. 08727838.8-1214 / 2106410 PCT/US2008051318, dated Mar. 9, 2010.
Communication for Application No. 08727838.8-1214 / 2106410 PCT/US2008051318, dated Oct. 22, 2010.
Communication for Application No. 08727838.8-1214 / 2106410 PCT/US2008051318, dated Sep. 28, 2012.

* cited by examiner

*Primary Examiner* — Roberto Rabago
(74) *Attorney, Agent, or Firm* — McAndews, Held & Malloy, Ltd.

(57) ABSTRACT

Improved methods for preparing sulfonated block polymers with acyl sulfates in non-halogenated aliphatic solvents are provided. The methods include the sulfonation of a precursor block polymer with an acyl sulfate in a reaction mixture further comprising at least one non-halogenated aliphatic solvent to form a sulfonated block polymer, wherein the initial concentration of the precursor block polymer is in the range of from about 0.1 wt % to a concentration that is below the limiting concentration of the precursor block polymer based on the total weight of the reaction mixture. A sulfonation degree of greater than about 1.0 milliequivalent sulfonic acid per gram sulfonated block polymer can be achieved substantially free of polymer precipitation and free of disabling gelation.

21 Claims, No Drawings

METHOD OF SULFONATION OF BLOCK POLYMERS

RELATED APPLICATIONS

This application is a continuation of U.S. application Ser. No. 12/498,778, having a filing date of Jul. 7, 2009, U.S. Pat. No. 8,835,562, which is a continuation of International application Serial No. PCT/US2008/051318 (International Publication No. WO 2008/089332), having an International filing date of Jan. 17, 2008. This PCT application claims priority to U.S. provisional application Ser. No. 60/885,804, filed Jan. 19, 2007. The entire specifications of the U.S., PCT and provisional applications referred to above are hereby incorporated by reference.

BACKGROUND OF THE INVENTION

The presently described technology relates generally to methods for making sulfonated polymers. More specifically, the presently described technology relates to the sulfonation of aromatic-containing polymers (e.g., styrenic block copolymers) in non-halogenated aliphatic solvents. In some preferred embodiments, the present technology relates to methods for sulfonating aromatic-containing block copolymers having at least two polymer end blocks that are resistant to sulfonation and at least one polymer interior block that is susceptible to sulfonation.

The presently described technology uses sulfonation reagents such as acyl sulfates to sulfonate aromatic-containing polymers in non-halogenated aliphatic solvents. In accordance with the present technology, the initial concentration of a polymer in a reaction mixture comprising a non-halogenated solvent can be kept below a limiting concentration such that high levels of sulfonation of the aromatic-containing polymer can be achieved in a manner that is free of disabling gelation.

Through the years, there have been many modifications made to aromatic-containing polymers (e.g., styrenic block copolymers) to change and improve their properties. One such modification is to sulfonate the polymers. Once a polymer containing sulfonation-susceptible units is polymerized, and if desired, hydrogenated, it can be sulfonated using a sulfonation reagent. The first information on sulfonation of high polymers such as polystyrene (PS) was published before World War II. Ever since, the utilization of sulfonated polymers in various industrial, domestic, and medical applications has been increasing steadily. Sulfonated ionomers were defined as macromolecular compounds containing sulfonic (~$SO_3$) groups. These compounds are utilized satisfactorily, because of their interesting chemical and mechanical properties, in a number of industrial applications, e.g., the production of compatible blends of non-miscible polymers, the use in ion exchange materials, the use in membranes for reverse osmosis and ultrafiltration, as plasticizers for macro-defect-free concretes, as conductive composites, etc. A general overview of polymer sulfonation can be found in Kucera, F., Jancar, J., *Polymer Engineering and Science* (1998), 38 (5), 783-792.

For example, one of the first sulfonated block copolymers is generally disclosed in U.S. Pat. No. 3,577,357 to Winkler. The selectively sulfonated block copolymer of the Winkler patent was characterized as having the general configuration A-B-(B-A)$_{1-5}$, wherein each A is a non-elastomeric sulfonated monovinyl arene polymer block and each B is a substantially saturated elastomeric hydrogenated polymer block made from dienes. The block copolymer in the Winkler patent was sulfonated to an extent sufficient to provide at least 1% by weight of sulfur in the total polymer and up to one sulfonated constituent for each monovinyl arene unit. The Winkler patent teaches that the sulfonation reaction is usually carried out while the copolymer is swollen by or dispersed in an inert medium such as a haloalkane. In the examples of the Winkler patent, a polystyrene-hydrogenated polyisoprene-polystyrene triblock copolymer in cyclohexane was treated with a sulfonating agent comprising sulfur trioxide/triethyl phosphate in 1,2-dichloroethane. Sulfonation of the polymer in cyclohexane in the presence of 1,2-dichloroethane was reported to be accompanied by gelation of the reaction mixture, even at a mere 1% polymer concentration and 2.1% sulfur incorporation (corresponding to about 0.66 milliequivalents per gram (meq/g) sulfonic acid).

U.S. Pat. No. 3,870,841 to Makowski et al., in general, discloses the sulfonation of plastic polymers. It teaches that sulfonic acid groups can be introduced into aromatic-containing polymers by direct reaction with a sulfonating agent, which can be, for example, sulfuric acid and chlorosulfonic acid, in halogenated solvents. Preferred sulfonating agents are acetyl sulfate and sulfur trioxide complexes with dioxane, tetrahydrofuran, and trialkyl phosphates. Allegedly, a sulfonation level of about 0.2 to about 10 mol % can be reached. In one example, a t-butylstyrene/isoprene random copolymer was sulfonated in methylene chloride with a triethylphosphate-$SO_3$ complex. The resulting polymer was reported to contain about 4.4 sodium sulfonate groups per 100 monomer units.

Although there are a number of known chemical reagents and routes that can be used to incorporate sulfonic acid groups into sulfonation-susceptible polymers, the difficulty of sulfonating polymers without gelation is widely appreciated in the art. See Sherrington, D.C.; Swann, A.; Huxham, I. M.; Tetley, L. *J. Mater. Chem.* 1993, 3, 781, and the references incorporated therein. Gelation of polymers can be caused by chemical gelation, physical gelation, or a combination thereof. Chemical gelation can be caused by polymer cross-linking through formations of covalent bonds such as sulfone cross-linking formations, for example. See *Polymer Engineering and Science* (1998), 38 (5), 783-792. Besides leading to polymer gelation, undesirable chemical cross-linking can also lead to polymer precipitation and/or intractability. Physical gelation, on the other hand, can be caused by non-covalent cross-linking. Physical gelation normally can be disrupted through appropriate solvent conditions. For example, Li, et al. *Reactive & Functional Polymers* 56:189 (2003) describes the "insolubility" of sulfonated poly[styrene]-block-[2-[(per-fluorononenyl)oxy]ethyl methacrylate] in toluene as being due to "physically cross-linked network in the block copolymer resulting form the intermolecular associations of the ionic dipoles in the system." It teaches that the addition of polar co-solvent readily enables the dissolution of the polymer.

The literature teaches the use of various acyl sulfates, which can be readily prepared from carboxylic acid anhydrides and sulfuric acid, for the sulfonation of aromatic-containing polymers without the formation of significant sulfone cross-linking groups. Although chemical gelation can be reduced or controlled by the use of acyl sulfates, physical gelation or polymer precipitation still poses a serious problem for polymer sulfonation. To reduce physical gelation or polymer precipitation, the reaction media of choice for the acyl sulfate methods disclosed in the literature are typically halogenated solvents such as dichloroethane. Halogenated solvents are alleged to not only afford solubility to the unsulfonated polymer and the acyl sulfate reagent (e.g., acetyl sulfate), but also to maintain the resulting sulfonated polymer in soluble form (e.g., a homogeneous liquid), without precipitation or disabling gelation. The use of halogenated solvent is, however, highly undesirable from an environmental, health, and safety (EH&S) standpoint. Methods that can effectively sulfonate aromatic-containing block copolymers in non-halogenated aliphatic solvents with equal or greater levels of sulfonic acid incorporation than in halogenated solvents would be highly desirable. Advantages of non-halogenated aliphatic solvents include, for example, (a) not suffering from the substantial environmental concerns associated with halogenated solvents; (b) typically being used in the preparation of the starting block copolymers, thereby enabling the sulfonation of polymer without the need for polymer isolation and re-dissolution prior to sulfonation; and/or (c) being suitable solvents for subsequent downstream processing of the sulfonated polymer into films, membranes, coatings, and the like.

However, in general, the utility of non-halogenated aliphatic solvents for the sulfonation of styrene containing polymers at increased levels of sulfonic acid incorporation appears to be problematic because the resultant sulfonated polymers, having highly polar sulfonic acid groups, are typically incompatible with the non-polar, non-halogenated aliphatic solvent, thereby resulting in disabling gelation and/or precipitation of the polymers. For example, Sheerington disclosed, in general, the failure of acyl sulfates to enable sulfonation of polymers such as poly(styrene)-poly (hydrogenated butadiene)-poly(styrene) triblock copolymers without gelation. See Sherrington, L. *J. Mater. Chem.*, 1993, 3, 781. For another example, in the Winkler patent discussed above, a polystyrene-hydrogenated polyisoprene-polystyrene triblock copolymer in cyclohexane was treated with a sulfonating agent comprising sulfur trioxide/triethyl phosphate dissolved in 1,2-dichloroethane. Sulfonation of the polymer was reported to be accompanied by gelation even in the presence of the halogenated solvent. In addition, the utility of many sulfonation reagents such as acetyl sulfate in combination with non-halogenated aliphatic solvents appears to be poor due to such sulfonation reagents having little or negligible solubility in the non-halogenated aliphatic solvents, resulting in very poor polymer sulfonation conversion.

To enable polymer sulfonation in non-halogenated aliphatic solvents, methods using higher acyl sulfates with adequate solubility have been developed. For example, the homogeneous sulfonation of polystyrene in cyclohexane with higher acyl sulfates such as lauroyl sulfate has been reported. See Thaler, W. A. *Macromolecules*, 1983, 16, 623. A treat level of 0.6 milliequivalents per gram (meq/g) lauroyl sulfate is defined in the Thaler paper as a level below which reaction solutions are "very tractable." Id. Above this level, the Thaler paper describes that "it was difficult to discern whether the polymer was completely soluble." Id. The Thaler paper also tested the use of propionyl sulfate and butyryl sulfate for sulfonating polystyrene in cyclohexane, but the treat level was very low, and much below the 0.6 meq/g level. The Thaler paper indicates that the solubility of polystyrene decreases with increasing sulfonation. Put in another way, the Thaler paper indicates that treatment levels above 60 milliequivalents (meq) of sulfonation reagent per 100 grams of polystyrene (affording corresponding polymer sulfonation levels of approximately greater than 0.35 meq sulfonic acid per gram sulfonated polymer, or about 3.75% degree of styrene sulfonation) resulted in increasing viscosity and difficulty in discernment of the solubility of the polymer product. The Thaler paper also notes that the by-product carboxylic acid appeared to play an important role in helping to maintain polymer solubility, apparently functioning as a co-solvent.

EP 0 071 347 to Thaler also discloses a process for sulfonating polystyrene and other aromatic-containing polymers using $C_8$ or higher acyl sulfates in non-halogenated aliphatic solvents such as cyclohexane. This patent provides a summary of the lack of solubility of lower acyl sulfates such as acetyl sulfate for sulfonation of polymer aromatic groups in non-halogenated aliphatic solvents to desired sulfonation levels. In addition, although EP 0 071 347 describes the sulfonated polymer products as "gel-free," the means by which gel is measured in the patent makes it clear that the term "gel" in this context refers to gel particles (typically formed by chemical cross-linking) that cannot be dissolved by the addition of appropriate solvents.

For another example of the use of higher acyl sulfates, the Li article discussed above discloses the use of lauroyl sulfate for the sulfonation of poly[styrene]-block-[2-[(per-fluorononenyl)oxy]ethyl methacrylate], with up to 28% styrene sulfonation, in cyclohexane. See Li, et al. *Reactive & Functional Polymers,* 56:189. The molecular weights of these polymers in the Li article were quite low, and the state of homogeneity or tractability during the course of sulfonation was not described.

Lower acyl sulfates such as $C_2$-$C_8$ sulfates, especially $C_2$ to $C_4$ sulfates have many advantages over the higher acyl sulfates or other sulfonation reagents. These lower acyl sulfates, as with other acyl sulfates, are capable of sulfonating aromatic rings with negligible sulfone formation, thereby proceeding without substantial chemical gelation. In addition, these lower acyl sulfates can be economically prepared from commercially available anhydrides with simple processing equipment. Furthermore, the lower acyl sulfates are more mass efficient than higher acyl sulfates on a molar basis. Still further, the by-product carboxylic acids of the $C_2$ to $C_4$ acyl sulfates are sufficiently volatile to enable at least partial removal of these acids from the sulfonated polymer product by evaporation methods known to people skilled in the art, and are sufficiently water soluble for effective removal without neutralization by washing methods known to people skilled in the art.

Xie, et al. *J. Applied Polymer Sci,* 96, 1398 (2005), discloses the use of acetone in combination with cyclohexane and acetyl sulfate to sulfonate highly unsaturated styrene-butadiene-styrene triblock copolymers. The Xie article ascribed gelation to the association of sulfonate groups. It noted that acetone might function to reduce this association. However, sulfonic acid incorporations are reported only up to about 0.45 meq/g. The IR spectra in the Xie article appear to show that the sulfonation occurred on both the polybutadiene segments and the polystyrene segments.

Therefore, there is still a need in the art for a method for producing sulfonated aromatic-containing polymers in non-halogenated aliphatic solvents that (1) is substantially free of polymer precipitation; (2) is free of disabling gelation; (3) can efficiently reach a high degree of sulfonation; and/or (4) uses lower acyl sulfates as the sulfonation reagents.

BRIEF SUMMARY OF THE INVENTION

The presently described technology relates generally to the sulfonation of aromatic-containing block copolymers in non-halogenated solvents, wherein the sulfonation can be achieved with high or increased levels of sulfonic acid incorporation into the polymers. The presently described technology is particularly useful to the production of sulfonated polymers such as those described in U.S. patent application Ser. No. 11/458,856 filed on Jul. 20, 2006, U.S. Pat. No. 7,737,224 and published as publication serial number, 20070021569, by Kraton Polymers LLC, Houston, Tex. The disclosure of U.S. patent application Ser. No. 11/458,856 is hereby incorporated herein by reference in its entirety. A sulfonation reaction mixture and/or resulting product in accordance with at least some embodiments of the present technology is free of disabling gelation.

In one aspect, the presently described technology provides a process for preparing sulfonated block polymers in non-halogenated aliphatic solvents, comprising the steps of:

providing a precursor block polymer having at least one end block A and at least one interior block B, which preferably has the general configuration of A-B-A, A-B-A-B-A, (A-B-A)$_n$X, (A-B)$_n$X, A-D-B-D-A, A-B-D-B-A, (A-D-B)$_n$X, (A-B-D)$_n$X, A-B-B-B-A, (A-B-B)$_n$X, or a mixture thereof, where n is an integer from 1 to 30, and X is a coupling agent residue, and wherein each A block is a polymer block resistant to sulfonation, each D block is a polymer block resistant to sulfonation, and each B block is a polymer block susceptible to sulfonation, said A, D and B blocks are substantially free of olefinic unsaturation; and reacting the precursor block polymer with an acyl sulfate in a reaction mixture further comprising at least one non-halogenated aliphatic solvent to form a sulfonated block polymer, wherein the initial concentration of the precursor block polymer is from about 0.1 wt % to a concentration that is below the limiting concentration of the precursor block polymer based on the total weight of the reaction mixture.

As a person skilled in the art will understand, a polymer used or produced in the presently described technology can be a single polymer or a mixture of polymers of the same or different kinds.

The initial concentration of the precursor block polymer preferably is in the range of from about 0.5 wt % to a concentration that is below the limiting concentration, alternatively from about 1.0 wt % to a concentration that is about 0.1 wt % below the limiting concentration, alternatively from about 2.0 wt % to a concentration that is about 0.1 wt % below the limiting concentration, alternatively from about 3.0 wt % to a concentration that is about 0.1 wt % below the limiting concentration, of the at least one precursor block polymer, based on the total weight of the reaction mixture. The meaning of the term "limiting concentration" as used herein is defined below in the detailed description. In at least some embodiments, the sulfonation reaction can be conducted in a manner that the reaction mixture is free of disabling gelation. Alternatively, the sulfonation reaction is conducted in a manner that the reaction product comprising the resulting sulfonated polymer and at least a portion of the non-halogenated aliphatic solvent is free of disabling gelation. Alternatively, both the reaction mixture and the reaction product in accordance with the present technology are substantially free of polymer precipitation and free of disabling gelation. In accordance with some embodiments, the reaction mixture of the present technology is substantially free of halogenated solvents.

The sulfonation reagents used in accordance with some embodiments of the present technology are acyl sulfates comprising an acyl group of from about 2 to about 8 carbon atoms, alternatively from about 3 to about 8 carbon atoms, alternatively from about 3 to about 5 carbon atoms. One preferred example is isobutyryl sulfate. The acyl sulfate can be obtained in an in-situ reaction conducted, for example, at the same temperature or a different temperature at which the sulfonation reaction is conducted, or alternatively at a temperature of from about 20° C. to about 40° C. Alternatively, the acyl sulfate can be obtained from a separate reaction prior to addition to the reaction mixture. In at least some embodiments, the molar ratio of acyl sulfate to sulfonation susceptible repeat units in the reaction mixture is from about 0.1 to about 2.0, alternatively from about 0.2 to about 1.3, alternatively from about 0.3 to about 1.0.

Preferably, the sulfonated block polymer has a degree of sulfonation greater than about 0.4 meq/g, alternatively greater than about 0.6 meq/g, alternatively greater than about 0.8 meq/g, alternatively greater than 1.0 meq/g, alternatively greater than 1.4 meq/g. In accordance with some embodiments, the B blocks are sulfonated to the extent of from about 10 to about 100 mol percent, alternatively from about 20 to about 95 mol percent, alternatively from about 30 to about 90 mol percent, alternatively from about 40 to about 70 mol percent, based on the units of sulfonation susceptible monomers in said B blocks.

The non-halogenated aliphatic solvent can be any compound which is a solvent for the precursor polymer or mixture of polymers and does not impede the sulfonation reaction. Typical examples include, but are not limited to, linear, branched, or cyclic saturated hydrocarbons of about 5 to 12 carbons, such as cyclohexane, methylcyclohexane, cyclopentane, cycloheptane, cyclooctane, isopentane, n-hexane, isohexane, n-heptane, isoheptane, n-octane, isooctane, n-nonane, n-decane, or mixtures thereof. In at least some embodiments, the non-halogenated aliphatic solvent comprises a first non-halogenated aliphatic solvent and a second non-halogenated aliphatic solvent. Preferably, the first non-halogenated aliphatic solvent is a solvent in which the precursor polymer is substantially soluble (e.g., cyclohexane or methylcyclohexane); the second non-halogenated solvent is chosen such that it is miscible with the first solvent, but is a poor solvent for the sulfonation susceptible block of the precursor polymer in the process temperature range and also does not impede the sulfonation reaction. In other words, the sulfonation susceptible block of the precursor polymer, preferably, is substantially insoluble in the second non-halogenated solvent in the process temperature range. In the case where the sulfonation susceptible block of the precursor polymer is polystyrene, suitable solvents which are poor solvents for polystyrene can be used as the second non-halogenated solvent including, for example, linear and branched aliphatic hydrocarbons up to about 12 carbons, such as hexane, heptane, octane, 2-ethyl hexane, isooctane, nonane, decane, paraffinic oils, mixed paraffinic solvents, and the like.

In another aspect, the presently described technology provides a process for preparing sulfonated block polymers in non-halogenated aliphatic solvents, comprising the step of forming micelles and/or other polymer aggregates in a reaction mixture. The sulfonation reaction in accordance with this process can be conducted in a manner that is free of disabling gelation in the reaction mixture and/or the reaction product.

The micelles and/or other polymer aggregates can be formed by:

(1) providing a precursor block polymer having at least one end block A and at least one interior block B, which preferably has the general configuration of A-B-A, A-B-A-B-A, (A-B-A)$_n$X, (A-B)$_n$X, A-D-B-D-A, A-B-D-B-A, (A-D-B)$_n$X, (A-B-D)$_n$X, A-B-B-B-A, (A-B-B)$_n$X, or a mixture thereof, where n is an integer from 1 to 30, and X is a coupling agent residue, and wherein each A block is a polymer block resistant to sulfonation, each D block is a polymer block resistant to sulfonation, and each B block is a polymer block susceptible to sulfonation, said A, D and B blocks are substantially free of olefinic unsaturation; and (2) reacting the precursor block polymer with an acyl sulfate in the reaction mixture further comprising at least one non-halogenated aliphatic solvent to form a sulfonated block polymer, wherein the initial concentration of the precursor block polymer is in the range of from about 0.1 wt % to a concentration that is below the limiting concentration of the precursor block polymer based on the total weight of the reaction mixture.

Without being bound by any particular theory, the micelles formed during the above sulfonation reaction for some embodiments of the present technology can be described as having a core comprising the sulfonated block or blocks and a substantial amount of the acyl sulfate sulfonating agent surrounded by the sulfonation resistant block or blocks swollen by the non-halogenated aliphatic solvent (e.g., a shell). Without being bound by any particular theory, the other polymer aggregates formed during the sulfonation reaction for some embodiments of the present technology can be described as discrete or non-discrete structures resulting from aggregation of polymer chains in ways other than the description provided above for micelles, and/or as loosely aggregated groups of two or more discrete micelles. One skilled in the art will recognize that the micelles and/or other polymer aggregates in accordance with the present technology can comprise one or more than one polymer molecule according to the composition of the polymer and the quality of the solvents. The description of the formation of micelles and/or other polymer aggregates from block copolymers based on the different solubility of the blocks is well know in the art, see, e.g., J. Noolandi and K. M. Hong, *Macromolecules* (16), page 1443, 1983 and J. R. Quintana, M. Villacampa, M. Munoz, A. Andrio and I. Katime, *Macromolecules*, (25), page 3125 and 3129, 1992.

In a further aspect, the presently described technology provides a process for preparing sulfonated block polymers in non-halogenated aliphatic solvents, comprising the steps of:

(1) pre-forming micelles and/or other polymer aggregates comprising a precursor block polymer prior to sulfonation by:

providing the precursor block polymer having at least one end block A and at least one interior block B, which preferably has the general configuration of A-B-A, A-B-A-B-A, (A-B-A)$_n$X, (A-B)$_n$X, A-D-B-D-A, A-B-D-B-A, (A-D-B)$_n$X, (A-B-D)$_n$X, A-B-B-B-A, (A-B-B)$_n$ X, or a mixture thereof, where n is an integer from 1 to 30, and X is a coupling agent residue, and wherein each A block is a polymer block resistant to sulfonation, each D block is a polymer block resistant to sulfonation, and each B block is a polymer block susceptible to sulfonation, said A, D and B blocks are substantially free of olefinic unsaturation; and mixing the precursor block polymer with at least one non-halogenated solvent to form the micelles and/or other polymer aggregates comprising the at least one precursor block polymer; and (2) sulfonating the pre-formed micelles and/or other polymer aggregates comprising the precursor block polymer with an acyl sulfate in a reaction mixture to form a sulfonated block polymer, wherein the initial concentration of the precursor block polymer is in the range of from about 0.1 wt % to a concentration that is below the limiting concentration of the precursor block polymer based on the total weight of the reaction mixture.

To assist in pre-forming the micelles and/or other polymer aggregates, in some embodiments, the non-halogenated aliphatic solvent comprises a first non-halogenated aliphatic solvent and a second non-halogenated aliphatic solvent. Preferably, the two solvents are chosen such that the precursor block polymer is substantially soluble in the first non-halogenated aliphatic solvent and the sulfonation susceptible block of the precursor polymer is substantially insoluble in the second non-halogenated aliphatic solvent. In accordance with some embodiments, the precursor block polymer, or polymers, is first mixed with the first non-halogenated aliphatic solvent to form a solution; and the second non-halogenated aliphatic solvent is then added to the first mixture to form a second mixture comprising the micelles and/or other polymer aggregates of the precursor block polymer. For example, in the case where the sulfonation susceptible block of the precursor polymer is polystyrene, the first aliphatic solvent can be cyclohexane or methylcyclohexane; and the second aliphatic solvent can be a linear or branched aliphatic solvent or a mixture of such linear or branched aliphatic solvents such as n-heptane.

Without being bound by any particular theory, the pre-formed micelles can be described as having a core comprising the sulfonation susceptible block or blocks swollen by the first aliphatic solvent surrounded by the sulfonation resistant block or blocks swollen by the mixture of the first and second non-halogenated aliphatic solvents (e.g., a shell). Without being bound by any particular theory, the other pre-formed polymer aggregates can be described as discrete or non-discrete structures resulting from aggregation of polymer chains in ways other than the description provided above for micelles, and/or as loosely aggregated groups of two or more discrete micelles.

In yet another aspect, the presently described technology provides a process for preparing sulfonated block polymers that are substantially water insoluble, comprising the steps of:

(1) providing a precursor block polymer in a reaction mixture further comprising at least one non-halogenated aliphatic solvent, wherein the precursor block polymer comprises at least two polymer end blocks A and at least one polymer interior block B, wherein each A block is a polymer block resistant to sulfonation and each B block is a polymer block susceptible to sulfonation; and (2) sulfonating the precursor block polymer in the reaction mixture until said at least one block B is substantially sulfonated, wherein the initial concentration of the precursor block polymer is in the range of from about 0.1 wt % to a concentration that is below the limiting concentration of the precursor block polymer based on the total weight of the reaction mixture, wherein the end blocks A is essentially not sulfonated.

In still another aspect, the presently described technology provides a process for preparing sulfonated polymers in non-halogenated aliphatic solvents, comprising the steps of:

(1) providing a precursor polymer comprising units susceptible to sulfonation; and (2) reacting the precursor block polymer with a sulfonation reagent such as an acyl sulfate in a reaction mixture further comprising at least one non-halogenated aliphatic solvent to form at least one sulfonated polymer, wherein the initial concentration of the precursor polymer is in the range of from about 0.1 wt % to a concentration that is below the limiting concentration of the precursor polymer based on the total weight of the reaction mixture, and the sulfonated polymer has a degree of sulfonation of greater than about 0.4 meq/g, alternatively greater than about 0.6 meq/g, alternatively greater than about 0.8 meq/g, alternatively great than 1.0 meq/g, alternatively great than 1.4 meq/g.

BRIEF DESCRIPTION OF SEVERAL VIEWS OF THE DRAWINGS

[Not Applicable]

DETAILED DESCRIPTION OF THE INVENTION

The presently described technology provides improved methods for sulfonating aromatic-containing block copolymer compositions using sulfonation reagents such as acyl sulfates in non-halogenated aliphatic solvents, for example cyclohexane or methylcyclohexane, or various mixtures of these and other non-halogenated aliphatic solvents. In accordance with at least some embodiments of the presently described technology, high or increased levels of sulfonation can be achieved in a reaction mixture that is free of disabling gelation.

As used herein, the term "disabling gelation" is defined as the development of very high viscosity, viscoelasticity, and/or lack of fluidity that renders the reaction mass intractable for economical processing, and may or may not be distinct from or accompanied by the aforementioned chemical gelation that is attributable to chemical sulfone cross-linking of polymer.

A variety of means can be used by one familiar with the art and the field described herein to conveniently judge whether a given outcome constitutes disabling gelation. Without limiting the scope of the term "disabling gelation" as defined above, such means include, for example, screening methods such as a pour test in which a specified volume of reaction product is placed in a funnel with a defined spout dimension and the rate of product flow is measured. One method of choice for determining whether a sulfonation reaction mixture or product is free of disabling gelation is a simple flow method.

More specifically, in accordance with this flow method, those reaction mixtures and products of the present technology that can flow through a standard Ford Cup device equipped with a #5 orifice can be judged to be free of disabling gelation. See Paul N. Gardner Co., Inc., Pompano Beach, Fla., 69 Years Anniversary Catalog, pp. 1382-1390 for a description of a standard Ford cup and #5 orifice. In the flow method, the Ford Cup is filled with a reaction mixture or reaction product and the ability of this material to flow under the force of gravity through the bottom orifice of the cup is visually assessed. Those materials that flow through the orifice such that no substantial residual material remains in the cup after 5 minutes, other than material that wets and/or coats the interior walls of the cup, are judged to be free of disabling gelation. In doing so, such reaction mixtures and products of the present technology may be more economically processable.

As used herein, the term "limiting concentration" refers to the initial concentration of a precursor polymer in a reaction mixture at or above of which disabling gelation occurs subsequently in the reaction and/or product mixture. Such limiting concentration is dependent on, for example, the composition of the polymer starting material, the identity of the solvent or solvent mixture used, and the desired degree of sulfonation of the polymer.

As used herein, the term "resistant to sulfonation" means that little, if any, sulfonation of the polymer blocks or repeating units referenced can occur; the term "susceptible to sulfonation" means that sulfonation is very likely to occur in the blocks or units referenced. The expression "resistant to sulfonation" as used herein with regard to end blocks and the expression "susceptible to sulfonation" with regard to the interior blocks, are meant to express that sulfonation occurs primarily in the interior block(s) of the copolymer so that the degree of sulfonation which occurs in the interior block(s), relative to the total degree of sulfonation of the block copolymer, is in most instances, higher than the degree of sulfonation which occurs in the end blocks. The degree of sulfonation in the interior block(s) is at least 85% of the total overall sulfonation of the block copolymer. In alternative embodiments, the degree of sulfonation in the interior block(s) is at least 90% of the total sulfonation, with the preferred amount in this embodiment being at least 95% of the total sulfonation. In some embodiments, the end blocks may show no sulfonation.

Throughout the specification, there are discussions relating to end blocks and interior blocks. In many instances, the structures related to end blocks represented by "A" and interior blocks represented by "B" are used. Such discussions, unless indicated otherwise, are not intended to be limited to only those block copolymers that contain "A" end blocks and "B" interior blocks, but are instead intended to be discussions that are representative of the structures of the block polymers in accordance with some preferred embodiments of the presently described technology in which end blocks are resistant to sulfonation and interior blocks are susceptible to sulfonation. The end blocks may also be represented by "A1", or "A2" blocks, and the interior blocks may be represented by "B1", "B2", "D", "E" or "F" blocks, for example. Furthermore, in some embodiments, more than one interior block may be susceptible to sulfonation, which may be the same or different from each other. For example, it shall be appreciated that the designation A-B-B-B-A may be equivalent to A-B-B1-B-A.

As used herein, the term "substantially free of olefinic unsaturation" means that the residual olefin unsaturation of a polymer (e.g., a block copolymer) or a polymer block is less than 2.0 milliequivalents of carbon-carbon double bonds per gram of the polymer or polymer block, preferably less than 0.2 milliequivalents of carbon-carbon double bonds per gram of the polymer or polymer block. This means, for example, that for any conjugated diene polymer component present in the polymer, such conjugated diene must be hydrogenated to an extent that at least 90% of the double bonds are reduced by hydrogenation, preferably at least 95% of the double bonds are reduced by hydrogenation, and even more preferably at least 98% of the double bonds are reduced by hydrogenation.

The precursor polymers used in the presently described technology contain repeating units or blocks that are susceptible to sulfonation. The precursor (or base) polymers can be made by a number of different processes, as known in the field of the present technology, including anionic polymerization, moderated anionic polymerization, cationic polymerization, Ziegler-Natta polymerization, and living or stable free radical polymerization. Anionic polymerization is described in the detailed description and in the patents referenced below. Moderated anionic polymerization processes for making styrenic block copolymers have been disclosed, for example, in U.S. Pat. Nos. 6,391,981, 6,455,651 and 6,492,469 (all to Kraton Polymers US LLC, Houston, Tex.). Cationic polymerization processes for preparing block copolymers are disclosed, for example, in U.S. Pat. No. 6,515,083 (to Kaneka Corporation, Osaka, JP) and U.S. Pat. No. 4,946,899 (to University of Akron, Akron, Ohio).

Living Ziegler-Natta polymerization processes that can be used to make block copolymers were reviewed by G. W. Coates, P. D. Hustad, and S. Reinartz in *Angew. Chem. Int. Ed.*, 2002, 41, 2236-2257. A subsequent publication by H. Zhang and K. Nomura (*JACS Communications*, 2005) describes the use of living Z-N techniques for making styrenic block copolymers in particular. Previous work in the field of nitroxide mediated living radical polymerization chemistry has been reviewed, for example, in C. J. Hawker, A. W. Bosman, and E. Harth, *Chemical Reviews*, 101 (12), pp. 3661-3688 (2001). As outlined in that review, styrenic block copolymers could be made using living or stable free radical techniques. For the polymers in accordance with at least one of the embodiments of the presently described technology, nitroxide mediated polymerization methods will be the preferred living or stable free radical polymerization process.

1. Precursor Polymer Structure

The presently described technology are especially suitable for making sulfonated block copolymers as described in U.S. patent application Ser. No. 11/458,856, U.S. Pat. No. 7,737,224 the description of which is incorporated herein by reference in its entirety.

In accordance with at least one embodiment, the precursor block polymers comprise at least two polymer end blocks and at least one saturated polymer interior block. Each end block is a polymer block resistant to sulfonation, and at least one interior block is a saturated polymer block susceptible to sulfonation. Preferably, the end and interior blocks are substantially free of olefinic unsaturation. Also preferably, each end block independently has a number average molecular weight between about 1,000 and about 60,000, and each interior block independently has a number average molecular weight between about 10,000 and about 300,000.

In accordance with at least one preferred embodiment, the precursor block polymers should be such that after sulfonation, the mol percentage of the end blocks will be sufficient such that the block copolymer will be insoluble in water and non-dispersible in water. In said block copolymer, the mol percent of the end blocks can be greater than 15%, alternatively greater than 20%, alternatively greater than 20% and less than 70%, alternatively greater than 20% and less than 50%. Without being bound by any particularly theory, it is believed that the hydrophobic units of the end blocks contribute to the sulfonated block copolymer's insolubility. Furthermore, if the end block mol percent approaches the lower values, hydrophobicity of the entire block copolymer can be adjusted by incorporating hydrophobic monomer units into the interior blocks.

In some embodiments, the precursor block copolymers to be sulfonated by the present technology have at least one, preferably at least two polymer end or outer blocks A and at least one saturated polymer interior block B, wherein each A block is independently a polymer block resistant to sulfonation and each B block is independently a polymer block susceptible to sulfonation.

Preferred structures have the general configuration A-B-A, $(A-B)_n(A)$, $(A-B-A)_n$, $(A-B-A)_nX$, $(A-B)_nX$, A-B-D-B-A, A-D-B-D-A, $(A-D-B)_n(A)$, $(A-B-D)_n(A)$, $(A-B-D)_nX$, $(A-D-B)_nX$, A-B-B-B-A, $(A-B-B)_nX$, or mixtures thereof, where n is an integer from 1 to about 30, X is coupling agent residue. Most preferred structures are either the linear A-B-A, A-D-B-D-A, $(A-B)_2X$, $(A-B-D)_2X$ and $(A-D-B)_2X$ structures or the radial structures $(A-B)_nX$, $(A-B-D)_nX$ and $(A-D-B)_nX$, where n is 3 to 6. Such block copolymers are typically made, for example, via anionic polymerization, cationic polymerization or Ziegler-Natta polymerization. Preferably, the block copolymers are made via anionic polymerization. It is recognized that in any polymerization, the polymer mixture may include a certain amount of diblock copolymers (e.g., an A-B copolymer), in addition to any linear and/or radial polymers.

The A blocks can be one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, (viii) derivatives thereof, and (ix) mixtures thereof. If the A segments are polymers of 1,3-cyclodiene or conjugated dienes, the segments can be hydrogenated subsequent to polymerization.

The para-substituted styrene monomers can be selected from, for example, para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene, derivatives thereof, or mixtures thereof. Preferred para-substituted styrene monomers include para-t-butylstyrene and para-methylstyrene, with para-t-butylstyrene being most preferred. Monomers may be mixtures of monomers, depending on the particular source. It is desired that the overall purity of the para-substituted styrene monomers be at least 90% wt, preferably at least 95% wt, and even more preferably at least 98% wt of the desired para-substituted styrene monomer.

When the A blocks are polymers of ethylene, it may be useful to polymerize ethylene via a Ziegler-Natta process, as taught in the references in the review article by G. W. Coates et al., as cited above, which disclosure is herein incorporated by reference. It is preferred to make the ethylene blocks using anionic polymerization techniques as taught in U.S. Pat. No. 3,450,795 (Langer et al.), which disclosure is herein incorporated by reference. The block molecular weight for such ethylene blocks will typically be between about 1,000 and about 60,000.

When the A blocks are polymers of alpha olefins of 3 to 18 carbon atoms, such polymers can be prepared by via a Ziegler-Natta process, as taught in the references in the review article by G. W. Coates et al., as cited above, which disclosure is herein incorporated by reference. Preferably, the alpha olefins are propylene, butylene, hexane or octene, with propylene being most preferred. The block molecular weight for such alpha olefin blocks will typically be between about 1,000 and about 60,000.

When the A blocks are hydrogenated polymers of 1,3-cyclodiene monomers, such monomers can be selected from 1,3-cyclohexadiene, 1,3-cycloheptadiene, or 1,3-cyclooctadiene. Preferably, the cyclodiene monomer is 1,3-cyclohexadiene. Polymerization of such cyclodiene monomers is disclosed in U.S. Pat. No. 6,699,941 (to Kraton Polymers U.S. LLC, Houston, Tex.), which disclosure is herein incorporated by reference. At least in some embodiments of the present technology, it will be preferred to hydrogenate the A blocks when using cyclodiene monomers since unhydrogenated polymerized cyclodiene blocks would be susceptible to sulfonation.

When the A blocks are hydrogenated polymers of conjugated acyclic dienes having a vinyl content less than 35 mol percent prior to hydrogenation, it is preferred that the conjugated diene is 1,3-butadiene. It is preferred that the vinyl content of the A blocks prior to hydrogenation be less than 35 mol percent, more preferably less than 30 mol percent. In certain embodiments, the vinyl content of the A blocks prior to hydrogenation will be less than 25 mol percent, preferably less than 20 mol percent, more preferably less than 15 mol percent, and even more preferably less than 10 mol percent. In this way, the A blocks can have a crystalline structure, similar to that of polyethylene. Such A block structures are disclosed in U.S. Pat. No. 3,670,054 (Shell Oil Company, New York, N.Y.) and U.S. Pat. No. 4,107,236 (Phillips Petroleum Company, Bartlesville, Okla.), which disclosures are herein incorporated by reference.

The A blocks may also be polymers of acrylic esters or methacrylic esters. These polymer blocks may be made according to the methods disclosed in U.S. Pat. No. 6,767,976 (Kuraray Co., Ltd., Kurashiki, JP), which disclosure is herein incorporated by reference. Specific examples of the methacrylic ester include, for example, esters of a primary alcohol and methacrylic acid, such as methyl methacrylate, ethyl methacrylate, propyl methacrylate, n-butyl methacrylate, isobutyl methacrylate, hexyl methacrylate, 2-ethylhexyl methacrylate, dodecyl methacrylate, lauryl methacrylate, methoxyethyl methacrylate, dimethylaminoethyl methacrylate, diethylaminoethyl methacrylate, glycidyl methacrylate, trimethoxysilylpropyl methacrylate, trifluoromethyl methacrylate, trifluoroethyl methacrylate; esters of a secondary alcohol and methacrylic acid, such as isopropyl methacrylate, cyclohexyl methacrylate and isobornyl methacrylate; or esters of a tertiary alcohol and methacrylic acid, such as tert-butyl methacrylate. Specific examples of the acrylic ester can include esters of a primary alcohol and acrylic acid, such as methyl acrylate, ethyl acrylate, propyl acrylate, n-butyl acrylate, isobutyl acrylate, hexyl acrylate, 2-ethylhexyl acrylate, dodecyl acrylate, lauryl acrylate, methoxyethyl acrylate, dimethylaminoethyl acrylate, diethylaminoethyl acrylate, glycidyl acrylate, trimethoxysilylpropyl acrylate, trifluoromethyl acrylate, trifluoroethyl acrylate; esters of a secondary alcohol and acrylic acid, such as isopropyl acrylate, cyclohexyl acrylate and isobornyl acrylate; or esters of a tertiary alcohol and acrylic acid, such as tert-butyl acrylate.

If necessary, as raw material or raw materials, one or more of other anionic polymerizable monomers may be used together with the (meth)acrylic ester in the presently described technology. Examples of the anionic polymerizable monomer that can be optionally used include methacrylic or acrylic monomers such as trimethylsilyl methacrylate, N-isopropylmethacrylamide, N-tert-butylmethacrylamide, trimethylsilyl acrylate, N-isopropylacrylamide, and N-tert-butylacrylamide. Moreover, there may be used a multifunctional anionic polymerizable monomer having in the molecule thereof two or more methacrylic or acrylic structures, such as methacrylic ester structures or acrylic ester structures (for example, ethylene glycol diacrylate, ethylene glycol dimethacrylate, 1,4-butanediol diacrylate, 1,4-butanediol dimethacrylate, 1,6-hexanediol diacrylate, 1,6-hexanediol dimethacrylate, trimethylolpropane triacrylate and trimethylolpropane trimethacrylate).

In the polymerization processes used to make the acrylic or methacrylic ester polymer blocks, either one of the monomers, for example, the (meth)acrylic ester may be used, or two or more thereof may be used in combination. When two or more of the monomers are used in combination, any co-polymerization form selected from random, block, tapered block, and the like co-polymerization forms may be affected by selecting conditions such as a combination of the monomers and the timing of adding the monomers to the polymerization system (for example, simultaneous addition of two or more monomers, or separate additions at intervals of a given time).

The A blocks may also contain up to about 15 mol percent of the vinyl aromatic monomers mentioned below for the B blocks. In some embodiments, the A blocks may contain up to about 10 mol percent, preferably they will contain only up to about 5 mol percent, and particularly preferably only up to about 2 mol percent of the vinyl aromatic monomers mentioned below for the B blocks. However, in the most preferred embodiments, the A blocks contain substantially no vinyl aromatic monomers mentioned below for the B blocks. Accordingly, the sulfonation level in the A blocks may be from about zero (0) to about 15 mol percent of the total monomers in the A block. Note that the ranges can include all combinations of mol percents listed herewith.

With regard to the saturated B blocks, each B block can comprise segments of one or more polymerized vinyl aromatic monomers selected from unsubstituted styrene monomer, ortho-substituted styrene monomers, meta-substituted styrene monomers, alpha-methyl styrene monomer, 1,1-diphenylethylene monomer, 1,2-diphenylethylene monomer, derivatives thereof, and mixtures thereof. In addition to the monomers and polymers noted immediately before, the B blocks may also comprise a hydrogenated copolymer of such monomer (s) with a conjugated diene selected from 1,3-butadiene, isoprene and mixtures thereof, having a vinyl content of between about 20 and about 80 mol percent. These copolymers with hydrogenated dienes may be random copolymers, tapered copolymers, block copolymers or controlled distribution copolymers. Accordingly, there are two preferred structures: one in which the B blocks are hydrogenated and comprise a copolymer of conjugated dienes and the vinyl aromatic monomers noted in this paragraph, and another in which the B blocks are unsubstituted styrene monomer blocks which are saturated by virtue of the nature of the monomer and do not require the added process step of hydrogenation.

The B blocks having a controlled distribution structure are disclosed in U.S. Published Patent Application No. 2003/0176582 filed by Kraton Polymers U.S. LLC, Houston, Tex., which disclosure is herein incorporated by reference. The B blocks comprising a styrene block are described herein. In one preferred embodiment, the saturated B blocks are unsubstituted styrene blocks, since the polymer will not then require a separate hydrogenation step.

In addition, another aspect of the presently described technology is to include at least one impact modifier block D having a glass transition temperature less than about 20° C. in the precursor block polymers. One such example of an impact modifier block D comprises a hydrogenated polymer or copolymer of a conjugated diene selected from isoprene, 1,3-butadiene and mixtures thereof having a vinyl content prior to hydrogenation of between about 20 and about 80 mol percent and a number average molecular weight of between about 1,000 and about 50,000. Another example of block D can be an acrylate or silicone polymer having a number average molecular weight of about 1,000 to about 50,000. In still another example, the D block can be a polymer of isobutylene having a number average molecular weight of about 1,000 to about 50,000.

In accordance with some embodiments, each A block independently has a number average molecular weight between about 1,000 and about 60,000, and each B block independently has a number average molecular weight between about 10,000 and about 300,000. Preferably, each A block has a number average molecular weight of between about 2,000 and about 50,000, more preferably between about 3,000 and about 40,000 and even more preferably between about 3,000 and about 30,000. Preferably, each B block has a number average molecular weight of between about 15,000 and about 250,000, more preferably between about 20,000 and about 200,000, and even more preferably between about 30,000 and about 100,000. Note that the ranges can also include all combinations of said number average molecular weights listed herewith.

The molecular weights of the blocks can be determined by light scattering measurements, for example, and are expressed as number average molecular weight. Preferably, the precursor polymers of the presently described technology have from about 8 mol percent to about 80 mol percent A blocks, preferably from about 10 to about 60 mol percent A blocks, more preferably more than about 15 mol percent A blocks, and even more preferably from about 20 to about 50 mol percent A blocks.

In some embodiments, the relative amount of sulfonation-susceptible vinyl aromatic monomers (which can be, for example, unsubstituted styrene monomer, ortho-substituted styrene monomer, meta-substituted styrene monomer, alpha-methylstyrene monomer, 1,1-diphenylethylene monomer, 1,2-diphenylethylene monomer, a derivative thereof, or a mixture thereof) in the precursor block copolymer is from about 5 to about 90 mol percent, preferably from about 5 to about 85 mol percent. In alternative embodiments, the amount can be from about 10 to about 80 mol percent, preferably from about 10 to about 75 mol percent, more preferably from about 15 to about 75 mol percent, with the most preferred being from about 25 to about 70 mol percent, based on the total mol amount of monomers in the precursor polymer. Note that the ranges can include all combinations of mol percents listed herewith.

As for the saturated B block, in one preferred embodiment, the mol percent of vinyl aromatic monomers (which can be unsubstituted styrene monomer, ortho-substituted styrene monomer, meta-substituted styrene monomer, alpha-methylstyrene monomer, 1,1-diphenylethylene monomer, 1,2-diphenylethylene monomer, a derivative thereof, or a mixture thereof) in each B block is from about 10 to about 100 mol percent, preferably from about 25 to about 100 mol percent, more preferably from about 50 to about 100 mol percent, even more preferably from about 75 to about 100 mol percent and most preferably 100 mol percent. Note that the ranges can include all combinations of mol percents listed herewith.

Non-limiting examples of precursor block polymers include those that can be represented by the following general structures:

(ptBS-S)$_n$;  i).

(ptBS-EB-S)$_n$;  ii).

(ptBS-S/EB)$_n$;  iii).

(ptBS-S/EB-S)$_n$; or  iv).

(ptBS-S-S/EB)$_n$,  v).

where: ptBS=para-tert-butylstyrene block; S=styrene block; EB=hydrogenated polybutadiene block; and S/EB=hydrogenated block of butadiene and styrene, where n=1 to 30.

2. Overall Anionic Process to Prepare Precursor Polymers

With regard to the process to prepare the precursor polymers, the anionic polymerization process comprises polymerizing the suitable monomers in solution with a lithium initiator. The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogen atoms make particularly suitable solvents. Preferred solvents for the presently described technology include non-halogenated aliphatic solvents that are substantially free of halogenated solvents. Useful solvents include cyclic alkanes, such as cyclopentane, cyclohexane, cycloheptane, and cyclooctane, all of which are non-halogenated and relatively non-polar. Other suitable solvents will be known to those skilled in the art and can be selected to perform effectively in a given set of process conditions, with polymerization temperature being one of the major factors taken into consideration.

Starting materials for preparing the block copolymers of the present invention include the initial monomers noted above. Other important starting materials for anionic co-polymerizations include one or more polymerization initiators. In the present technology, such polymerization initiators include, for example, alkyl lithium compounds such as s-butyllithium, n-butyllithium, t-butyllithium, amyllithium and the like and other organo lithium compounds including di-initiators such as the di-sec-butyl lithium adduct of m-diisopropenyl benzene. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known in the art, and readily available to people skilled in the art.

Polymerization conditions to prepare the block copolymers of the present technology are typically similar to those used for anionic polymerizations in general. In accordance with some embodiments of the present technology, polymerization can be preferably carried out at a temperature of from about −30° C. to about 150° C., more preferably about 10° C. to about 100° C., and most preferably, in view of industrial limitations, from about 30° C. to about 90° C. The polymerization can be carried out in an inert atmosphere, preferably nitrogen, and may also be accomplished under pressure within the range of from about 0.5 to about 10 bars. This co-polymerization generally requires less than about 12 hours, and can be accomplished in from about 5 minutes to about 5 hours, depending upon the temperature, the concentration of the monomer components, and the molecular weight of the polymer that is desired. When two or more of the monomers are used in combination, any co-polymerization form selected from random, block, tapered block, controlled distribution block, and the like co-polymerization forms may be utilized.

It is recognized that the anionic polymerization process could be moderated by the addition of a Lewis acid, such as an aluminum alkyl, a magnesium alkyl, a zinc alkyl, or a combination thereof. The effects of the added Lewis acid on the polymerization process can include one or more of the following: (1) to lower the viscosity of the living polymer solution allowing for a process that operates at higher polymer concentrations and thus uses less solvent, (2) to enhance the thermal stability of the living polymer chain end which permits polymerization at higher temperatures and again, reduces the viscosity of the polymer solution allowing for the use of less solvent, and (3) to slow the rate of reaction which permits polymerization at higher temperatures, while using the same technology for removing the heat of reaction as had been used in the standard anionic polymerization process. The processing benefits of using Lewis acids to moderate anionic polymerization techniques have been disclosed in various literatures and known in the art. The polymer made by such a moderated, anionic polymerization process can have the same structure as one prepared using the conventional anionic polymerization process and as such, this process can be useful in making the precursor polymers of the present technology.

For Lewis acid moderated, anionic polymerization processes, reaction temperatures between about 100° C. and about 150° C. are preferred, as at these temperatures it is possible to take advantage of conducting the reaction at very high polymer concentrations. While a stoichiometric excess of the Lewis acid may be used, in most instances there is not a sufficient processing benefit so as to justify the additional cost of the excess Lewis acid. It is preferred to use from about 0.1 to about 1 mole of Lewis acid per mole of living, anionic chain ends to achieve an improvement in process performance with the moderated, anionic polymerization technique.

Linear polymers may be prepared by sequential block polymerization, as can be appreciated by those skilled in the art. Preparation of radial (branched) polymers requires a post-polymerization step called "coupling." In accordance with some embodiments, the "n" in the above radial formulas is an integer of from 1 to about 30, preferably from about 2 to about 15, and more preferably from 2 to 6, and X is the remnant or residue of a coupling agent. A variety of coupling agents are known in the art and can be used in preparing the coupled block copolymers of the presently described technology. These coupling agents include, for example, dihaloalkanes, silicon halides, siloxanes, multifunctional epoxides, silica compounds, esters of monohydric alcohols with carboxylic acids, (e.g. methylbenzoate and dimethyl adipate) and epoxidized oils.

Star-shaped polymers can be prepared with polyalkenyl coupling agents as disclosed in, for example, U.S. Pat. Nos. 3,985,830, 4,391,949, and 4,444,953, as well as Canadian Patent No. 716,645, each incorporated herein by reference. Suitable polyalkenyl coupling agents include divinylbenzene, and preferably, m-divinylbenzene. Other preferred polyalkenyl coupling agents include tetra-alkoxysilanes such as tetramethoxysilane (TMOS) and tetra-ethoxysilane (TEOS), tri-alkoxysilanes such as methyltrimethoxysilane (MTMS), aliphatic diesters such as dimethyl adipate and diethyl adipate, and diglycidyl aromatic epoxy compounds such as diglycidyl ethers deriving from the reaction of bis-phenol A and epichlorohydrin. It should be understood by those skilled in the art that any combination of methods to produce sequential, radial, and/or star-shaped polymers or mixtures thereof may be employed in the practice of the present technology described herein and as set forth in the appended claims.

3. Process to Prepare Hydrogenated Block Copolymers.

In some cases, for example, (1) when there is a diene in the B interior blocks, (2) when the A block is a polymer of a 1,3-cyclodiene, (3) when there is an impact modifier block D, or (4) when the A block is a polymer of a conjugated diene having a vinyl content of less than about 35 mol percent, it is preferred to selectively hydrogenate the block copolymer to substantially remove olefinic unsaturation. Hydrogenation can generally improve thermal stability, ultraviolet light stability, oxidative stability, and, therefore, weatherability of the final polymer, and reduces any chance for sulfonation of the A block or the D block as described above.

Hydrogenation can be carried out via any of the several hydrogenation or selective hydrogenation processes known in the art. In general, these methods operate to hydrogenate polymers containing ethylenic unsaturation and can be based upon operation of a suitable catalyst. Such catalyst, or catalyst precursor, preferably comprises a Group VIII metal such as nickel or cobalt which can be combined with a suitable reducing agent such as an aluminum alkyl or hydride of a metal selected from Groups I-A, II-A and III-B of the Periodic Table of Elements, particularly lithium, magnesium or aluminum. This preparation can be accomplished in a suitable solvent or diluent at a temperature from about 20° C. to about 80° C. Other catalysts that are useful include, for example, titanium based catalyst systems.

In some embodiments of the presently described technology, hydrogenation can be carried out under conditions such that at least about 90 percent of the conjugated diene double bonds have been reduced, and between zero and about 10 percent of the arene double bonds have been reduced. Preferred ranges are such that at least about 95 percent of the conjugated diene double bonds reduced, and more preferably such that about 98 percent of the conjugated diene double bonds are reduced.

In one preferred embodiment, once the hydrogenation is complete, the precursor polymer solution or mixture resulted can be sulfonated without removing the hydrogenation catalyst or recovering the precursor polymer from the polymer solution or mixture.

In another embodiment, once the hydrogenation is complete, the precursor polymer solution or mixture is treated to oxidize and extract the catalyst by stirring with the polymer solution or mixture a relatively large amount of aqueous acid (preferably from about 1 to about 30 percent by weight acid), at a volume ratio of about 0.5 parts aqueous acid to about 1 part polymer solution or mixture. The nature of the acid is not critical. Suitable acids include, for example, phosphoric acid, sulfuric acid and organic acids. This stirring can be continued at about 50° C. for from about 30 to about 60 minutes while sparging with a mixture of oxygen in nitrogen. Care should be exercised in this step to avoid forming an explosive mixture of oxygen and hydrocarbons. It will be understood by those skilled in the art that in some embodiments of the present technology, hydrogenated polymers that have been so treated should be dried before subsequent sulfonation, so that the residual water will not inhibit or prevent the sulfonation reaction.

4. Process to Make Sulfonated Polymers

Once the polymer is polymerized, and if desired, hydrogenated, it can be sulfonated using a sulfonation reagent such as an acyl sulfate in a non-halogenated aliphatic solvent by processes of the presently described technology. In some embodiments, the precursor polymer can be sulfonated after being isolated, washed, and dried from the reaction mixture resulting from the production of the precursor polymer. In some other embodiments, the precursor polymer can be sulfonated without being isolated from the reaction mixture resulting from the production of the precursor polymer.

In general, the processes of the presently described technology can sulfonate styrene block copolymers of the structures as described above in a non-halogenated aliphatic solvent such as cyclohexane or methylcyclohexane using sulfonation reagents such as acyl sulfates. The sulfonated polymers in the reaction systems of the present technology exhibit adequate solubility to achieve good sulfonation conversion. In some preferred embodiments of the present technology, the reaction systems are substantially free of halogenated solvents. In accordance with the methods of the present technology, high levels of styrene sulfonation can be achieved in a manner that is free of disabling gelation in the reaction mixture, the reaction product, or both, by maintaining the precursor polymer concentration below a limiting concentration of the precursor polymer, at least during the early stages of sulfonation. A person skilled in the art will understand, however, during the production of the sulfonated polymer in some embodiments of the present technology, especially in a semi-batch or continuous production process, the total concentration of the polymers in the reaction mixture may be above the limiting concentration of the precursor polymer.

In accordance with some embodiments of the present technology, high levels of styrene sulfonation can be achieved in a manner that is substantially free of polymer precipitation and free of disabling gelation in the reaction mixture, the reaction product, or both. A person skilled in the art will understand that in a mixture that is substantially free of polymer precipitation, minor amounts of polymers might deposit on surfaces as a result of localized solvent evaporation during the course of processing. For example, in accordance with some embodiments of the present technology, a mixture is considered to be substantially free of polymer precipitation when no more than 5% of the polymer in the mixture has precipitated.

The polymer concentration at which the sulfonation can be conducted is dependent upon the composition of the starting polymer, since the limiting concentration below which polymer gelation is non-disabling or negligible is dependent upon the polymer composition. As stated above, the limiting concentration may also be dependent on other factors such as the identity of the solvent or the solvent mixture used and the degree of sulfonation desired. Generally, the polymer concentration falls within the range of from about 1 wt % to about 30 wt %, alternatively from about 1 wt % to about 20 wt %, alternatively from about 1% to about 15 wt %, alternatively from about 1% to about 12 wt %, or alternatively from about 1 wt % to about 10 wt %, based on the total weight of a reaction mixture that is preferably substantially free of halogenated solvents. In accordance with some embodiments of the presently described technology, the initial concentration of the precursor polymer or mixture of precursor polymers should be maintained below the limiting concentration of the precursor polymer(s), alternatively in the range of from about 0.1 wt % to a concentration that is below the limiting concentration of the precursor polymer(s), alternatively from about 0.5 wt % to a concentration that is below the limiting concentration of the precursor polymer(s), alternatively from about 1.0 wt % to a concentration that is about 0.1 wt % below the limiting concentration of the precursor polymer(s), alternatively from about 2.0 wt % to a concentration that is about 0.1 wt % below the limiting concentration of the precursor polymer(s), alternatively from about 3.0 wt % to a concentration that is about 0.1 wt % below the limiting concentration of the precursor polymer(s), alternatively from about 5.0 wt % to a concentration that is about 0.1 wt % below the limiting concentration of the precursor polymer(s), based on the total weight of the reaction mixture.

As is exemplified in the Example section, the sulfonation of a block copolymer of the structure (ptBS-EB-S)$_n$ and having a styrene content of about 42% and a para-tert-butylstyrene content of about 43% can be conveniently carried out at about 5% to 6% polymer concentration, whereas sulfonation of the same block copolymer at about 7% polymer concentration results in disabling gelation of the reaction mixture and the reaction product.

At least in some embodiments, maintaining the polymer concentration below the limiting concentration can result in reaction mixtures with reduced concentrations of by-product carboxylic acid relative to the higher concentration conditions that lead to gelation. Further, as exemplified in the Example section, the degree of styrene unit sulfonation that can be achieved without polymer precipitation or disabling gelation by the methods of the present technology unexpectedly far exceeds those reported in the literature for polystyrene sulfonation in non-halogenated aliphatic solvents.

Any known method for the generation of acyl sulfate may be used in performing the methods of the presently described technology. The acyl group preferably is derived from a $C_2$ to $C_8$, alternatively $C_3$ to $C_8$, alternatively $C_3$ to $C_5$, linear, branched, or cyclic carboxylic acid, anhydride, or acid chloride, or mixtures thereof. Preferably, these compounds do not contain non-aromatic carbon-carbon double bonds, hydroxyl groups, or any other functionality that is reactive with acyl sulfate or decomposes readily under sulfonation reaction conditions. For example, acyl groups that have aliphatic quaternary carbons in the alpha-position from the carbonyl functionality (e.g., acyl sulfate derived from trimethylacetic anhydride) appear to decompose readily during polymer sulfonation reaction, and preferably should be avoided in the presently described technology. Also included in the scope of useful acyl groups for the generation of acyl sulfate in the present technology are those derived from aromatic carboxylic acids, anhydrides, and acid chlorides such as benzoic and phthalic anhydride. More preferably, the acyl group is selected from the group of propionyl, n-butyryl, and isobutyryl. Even more preferably, the acyl group is isobutyryl. It has been discovered that isobutyryl sulfate can afford high degrees of polymer sulfonation and relatively minimal by-product formation.

The formation of acyl sulfate from a carboxylic anhydride and sulfuric acid can be represented by the following general formula:

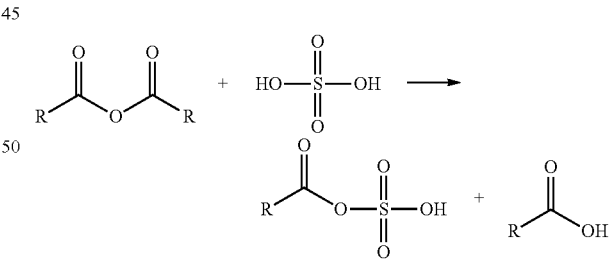

Acyl sulfates are subject to slow decomposition during the course of sulfonation reactions to afford alpha-sulfonated carboxylic acids of the following general formula:

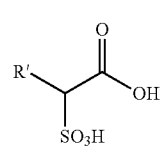

In one embodiment of the presently described technology, the acyl sulfate reagent is obtained from a carboxylic anhydride and sulfuric acid in a reaction that is conducted in a separate "pre-generation" reaction prior to addition to a solution of polymer in a non-halogenated aliphatic solvent. The pre-generation reaction can be conducted with or without a solvent. When a solvent is used to pre-generate the acyl sulfate, the solvent is preferably non-halogenated. Alternatively, the acyl sulfate reagent can be obtained in an in-situ reaction within a solution of the polymer in a non-halogenated aliphatic solvent. In accordance with this embodiment of the present technology, the molar ratio of anhydride to sulfuric acid can be from about 0.8 to about 2, and preferably from about 1.0 to about 1.4. The sulfuric acid used in this preferred method preferably has a concentration of about 93% to about 100% and more preferably has a concentration of about 95% to about 100%, by weight. Those skilled in the art will recognize that oleum may be used as an alternative to sulfuric acid in an in-situ reaction to generate acyl sulfate, provided that the oleum strength is sufficiently low so as to avoid or minimize unintended charring of the reaction mixture.

In another embodiment of the present technology, the acyl sulfate reagent can be obtained from a carboxylic anhydride and oleum in a reaction that is conducted in a separate "pre-generation" reaction prior to addition to a solution of polymer in aliphatic solvent, wherein the oleum strength is in the range of from about 1% to about 60% free sulfur trioxide, alternatively from about 1% to about 46% free sulfur trioxide, alternatively from about 10% to about 46% free sulfur trioxide, and wherein the molar ratio of anhydride to sulfuric acid present in the oleum is from about 0.9 to about 1.2.

Additionally, the acyl sulfate reagent can also be prepared from a carboxylic anhydride via reaction with any combination of sulfuric acid, oleum, or sulfur trioxide. Further, the acyl sulfate reagent can be prepared from a carboxylic acid via reaction with chlorosulfonic acid, oleum, sulfur trioxide, or any combination thereof. Moreover, the acyl sulfate reagent can also be prepared from a carboxylic acid chloride via reaction with sulfuric acid. Alternatively, the acyl sulfate may be prepared from any combination of carboxylic acid, anhydride, and/or acid chloride.

The sulfonation of polymer styrenic repeat units with the acyl sulfate can be represented by the following general formula:

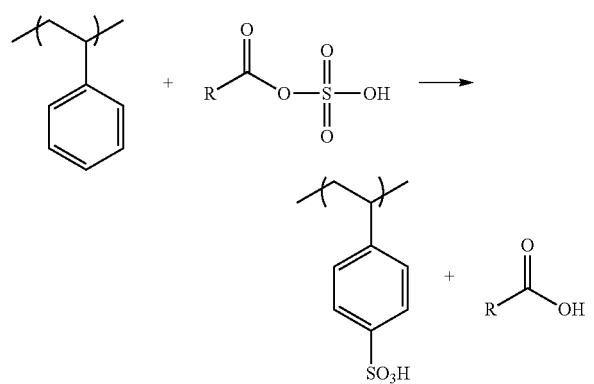

The amount of acyl sulfate reagent that may be used relative to the moles of sulfonation susceptible monomer repeat units present in the polymer solution may range from very low levels for lightly sulfonated polymer products to high levels for heavily sulfonated polymer products. The molar amount of the acyl sulfate can be defined as the theoretical amount of the acyl sulfate that can be generated from a given method, the amount being dictated by the limiting reagent in the reaction. The molar ratio of acyl sulfate to styrene repeat units (i.e., sulfonation susceptible units) in accordance with some embodiments of the present technology may be from about 0.1 to about 2.0, alternatively from about 0.2 to about 1.3, alternatively from about 0.3 to about 1.0.

In accordance with at least some embodiments of the presently described technology, the degree of sulfonation of the vinyl aromatic monomers susceptible to sulfonation in the block polymers is greater than about 0.4 milliequivalents (meq) sulfonic acid per gram sulfonated polymer (0.4 meq/g), alternatively greater than about 0.6 meq sulfonic acid per gram sulfonated polymer (0.6 meq/g), alternatively greater than about 0.8 meq sulfonic acid per gram sulfonated polymer (0.8 meq/g), alternatively greater than about 1.0 meq sulfonic acid per gram sulfonated polymer (1.0 meq/g), alternatively greater than about 1.4 meq sulfonic acid per gram sulfonated polymer (1.4 meq/g). For example, after the precursor polymers described above are sulfonated in accordance with the methods of the presently described technology, the typical levels of sulfonation are where each B block contains one or more sulfonic functional groups. Preferred levels of sulfonation are from about 10 to about 100 mol percent, alternatively from about 20 to 95 mol percent, alternatively from about 30 to 90 mol percent, and alternatively from about 40 to about 70 mol percent, based on the mol percent of sulfonation susceptible vinyl aromatic monomers in each B block, which can be, for example, unsubstituted styrene monomer, ortho-substituted styrene monomer, meta-substituted styrene monomer, alpha-methylstyrene monomer, 1,1-diphenylethylene monomer, 1,2-diphenylethylene monomer, a derivative thereof, or a mixture thereof. Note that the range of sulfonation can include all combinations of mol percents listed herewith.

The level or degree of sulfonation of a sulfonated polymer can be measured by a NMR and/or titration methods as known to people skilled in the art, and/or a method using two separate titrations as described in the Examples below and may be appreciated by people skilled in the art. For example, a resulting solution from the methods of the present technology can be analyzed by $^1$H NMR at about 63° C. The percentage styrene sulfonation can be calculated from the integration of aromatic signals in the $^1$H NMR spectrum. For another example, the reaction product can be analyzed by two separate titrations (the "two-titration method") to determine the levels of styrenic polymer sulfonic acid, sulfuric acid, and non-polymeric by-product sulfonic acid (e.g. 2-sulfo-alkylcarboxylic acid), and then to calculate the degree of styrene sulfonation based on mass balance. More information about the NMR method and the two-titration method are described in Example 2 below. Alternatively, the level of sulfonation can be determined by titration of a dry polymer sample, which has been redissolved in tetrahydrofuran with a standardized solution of NaOH in a mixed alcohol and water solvent. In this last case, rigorous removal of by-product acids are preferably ensured.

Without being bound by any particular theory, it is believed that the means by which a good sulfonation level can be achieved in a non-halogenated solvent without polymer precipitation or disabling gelation is through a mechanism in which the polymer forms micelles and/or other polymer aggregates that sequester the styrene sulfonic acid moieties away from the solvent, thereby preventing or minimizing polymer associative thickening-like behavior that can otherwise leads to gelation. The importance of such sequestration is exemplified by the fact that upon isolation from the reaction medium, the sulfonated polymer product will not redissolve in the same non-halogenated aliphatic solvent but will readily dissolve in more polar solvents or solvent blends such as tetrahydrofuran (THF) or mixtures of xylenes with isopropyl alcohol. Evidence for the formation of sulfonated polymer micelles and/or other polymer aggregates in a solution or mixture has been obtained via dynamic light scattering-based particle size analyses. In some instances, dependent on the starting polymer composition and solvent selection, the initial polymer solution prior to sulfonation may be largely free of micelles and/or other polymer aggregates, as judged by dynamic light scattering under dilute conditions, and subsequently forms such micelles and/or other polymer aggregates relatively early in the sulfonation conversion. In other instances, the initial polymer solution may be comprised primarily of aggregated species that directly sulfonate with minimal change in light scattering profile. In yet some other instances, the initial polymer solution may be comprised of a mixture of micelles and non-aggregated polymer. Formation of micelles and/or other polymer aggregates from block copolymers based on the different solubility of the blocks is well know in the art, see for example J. Noolandi and K. M. Hong, *Macromolecules* (16), page 1443, 1983 and J. R. Quintana, M. Villacampa, M. Munoz, A. Andrio and I. Katime, *Macromolecules*, (25), page 3125 and 3129, 1992. For dynamic light scattering from micellar solutions and mixtures, see A. S. Yeung and C. W. Frank, *Polymer,* 31, pages 2089-2100 and 2101-2111 (1990).

Without being bound by any particular theory, the micelles formed during the above sulfonation reaction for some embodiments of the present technology can be described as having a core comprising the sulfonated block or blocks and a substantial amount of the acyl sulfate sulfonating agent surrounded by the sulfonation resistant block or blocks swollen by the non-halogenated aliphatic solvent (e.g., a shell). The other polymer aggregates formed during the sulfonation reaction for some embodiments of the present technology can be described as discrete or non-discrete structures resulting from aggregation of polymer chains in ways other than the description provided above for micelles, and/or as loosely aggregated groups of two or more discrete micelles. One skilled in the art will recognize that the micelles and/or other polymer aggregates in accordance with the present technology can comprise one or more than one polymer molecule according to the composition of the polymer and the quality of the solvents.

The presently described technology uses non-halogenated aliphatic solvents to form reaction mixtures. In accordance with at least some embodiments of the present technology, the reaction mixtures are substantially free of halogenated solvents. The non-halogenated solvents can be linear, branched, and cyclic aliphatic hydrocarbons with from about 5 to about 10 carbons. Examples of suitable non-halogenated solvents include, but are not limited to, cyclohexane, methylcyclohexane, cyclopentane, cycloheptane, cyclooctane, isopentane, n-hexane, isohexane, n-heptane, isoheptane, n-octane, isooctane, n-nonane, n-decane, and mixtures thereof. Preferred non-halogenated solvents are cyclohexane, methylcyclohexane, cyclopentane, cycloheptane, cyclooctane, or mixtures thereof. More preferred non-halogenated solvents are cyclohexane, methylcyclohexane, or mixtures thereof.

It has been discovered that for at least some embodiments of the present technology, polymer micelles and/or other polymer aggregates can be pre-formed before sulfonation even when a single non-halogenated solvent is used. It has been further discovered that for at least some other embodiments of the present technology, the addition of a second non-halogenated aliphatic solvent to a solution of the precursor polymer in a first non-halogenated aliphatic solvent can result in or assist the "pre-formation" of polymer micelles and/or other polymer aggregates. In this instance, preferably, the precursor polymer to be sulfonated is substantially soluble in the first non-halogenated solvent, which can be, for example, cyclohexane methylcyclohexane, or mixtures thereof. The second non-halogenated solvent, on the other hand, is preferably chosen such that it is miscible with the first solvent, but is a poor solvent for the sulfonation susceptible block of the precursor polymer in the process temperature range and also does not impede the sulfonation reaction. In other words, preferably, the sulfonation susceptible block of the precursor polymer is substantially insoluble in the second non-halogenated solvent in the process temperature range. In the case where the sulfonation susceptible block of the precursor polymer is polystyrene, suitable solvents which are poor solvents for polystyrene and can be used as the second non-halogenated solvent include linear and branched aliphatic hydrocarbons up to about 12 carbons, for example, hexane, heptane, octane, 2-ethyl hexane, isooctane, nonane, decane, paraffinic oils, mixed paraffinic solvents, and the like. One preferred example of the second non-halogenated aliphatic solvent is n-heptane.

Without being bound by any particular theory, the pre-formed micelles can be described as having a core comprising the sulfonation susceptible block or blocks swollen by the first aliphatic solvent surrounded by the sulfonation resistant block or blocks swollen by the mixture of the first and second non-halogenated aliphatic solvents (e.g., a shell). The other pre-formed polymer aggregates can be described as discrete or non-discrete structures resulting from aggregation of polymer chains in ways other than the description provided above for micelles, and/or as loosely aggregated groups of two or more discrete micelles. One skilled in the art will recognize that the micelles and/or other polymer aggregates can comprise more than one polymer molecule according to the composition of the polymer and the quality of the solvents.

It has been surprisingly found that in some instances the pre-formed polymer micelles and/or other polymer aggregates can allow the sulfonation of the polymer without disabling gelation at considerably higher concentration than that can be achieved without the addition of the second solvent. In addition, this approach can substantially improve the utility of more polar acyl sulfates, such as $C_3$ acyl sulfate (propionyl sulfate), in terms of polymer sulfonation conversion rate and minimization of by-products. In other words, this approach can improve the utility of more polar sulfonation reagents.

The sulfonation reaction between the acyl sulfates and aromatic-containing polymers (e.g., styrenic block copolymers) of the presently described technology can be conducted at a reaction temperature in the range of from about 20° C. to about 150° C., alternatively from about 20° C. to about 100° C., alternatively from about 20° C. to about 80° C., alternatively from about 30° C. to about 70° C., alternatively from about 40° C. to about 60° C. (e.g., at about 50° C.). The reaction time can be in the range of from approximately less than 1 minute to approximately 24 hours or longer, dependent on the temperature of the reaction. In some preferred acyl sulfate embodiments that utilize in-situ reaction of carboxylic anhydride and sulfuric acid, the initial temperature of the reaction mixture can be about the same as the intended sulfonation reaction temperature. Alternatively, the initial temperature may be lower than the intended subsequent sulfonation reaction temperature. In a preferred embodiment, the acyl sulfate can be generated in-situ at about 20° C. to about 40° C. (e.g., at about 30° C.) for about 0.5 to about 2 hours, alternatively about 1 to about 1.5 hours, and then the reaction mixture can be heated to about 40° C. to about 60° C. to expedite the completion of the reaction.

Although not required as part of the inventive methods of the present technology, an optional reaction quenching step can be conducted through the addition of a quenching agent, which can be, for example, water or hydroxyl-containing compounds such as methanol, ethanol, or isopropanol. Typically in such a step, an amount of the quenching agent at least sufficient to react with residual unreacted acyl sulfate may be added.

In some embodiments of the presently described technology, the sulfonation of the aromatic-containing polymer in a non-halogenated aliphatic solvent can be carried out by contacting the aromatic-containing polymer with a sulfonation reagent in a batch reaction or a semi-batch reaction. In some other embodiments of the present technology, the sulfonation can be carried out in a continuous reaction, which can be enabled, for example, through the use of a continuous stirred tank reactor or a series of two or more continuous stirred tank reactors.

The methods of the present technology are useful for the preparation of sulfonated styrenic block copolymers that have utility in the formation of membranes and coatings as described in U.S. patent application Ser. No. 11/458,856, U.S. Pat. No. 7,737,224 which has been incorporated by reference in its entirety by the present specification. In some embodiments, the reaction mixture of a sulfonated polymer resulting from the methods of the present technology can be used without isolation of the polymer from reaction mixture to form membranes, coatings or other articles either directly or with the addition of minor components to improve the performance of the article.

It is also contemplated that the methods of the presently described technology can be utilized for sulfonating other classes of polymers, whether styrene-containing, other aromatic functional group-containing, unsaturated, or otherwise reactive towards sulfonation reagents, especially if they are capable of sequestering sulfonic acid groups away from the solvent through intramolecular "collapse" or intermolecular aggregation such that the polymers do not precipitate from or exhibit disabling gelation in non-halogenated aliphatic solvents.

Although the methods of the present technology for sulfonating polymers are described above in the context of acyl sulfate reagents, the utility of other sulfonation reagents are also contemplated. For example, the use of those sulfonation reagents derived from the complexation/reaction of sulfur trioxides with phosphate esters such as triethylphosphate has been demonstrated in the present technology. The chemistry of such sulfonation reagents is known in the art to afford aromatic sulfonation with significant degrees of sulfonic acid alkyl ester incorporation. As such, the resultant sulfonated polymers likely contain both sulfonic acid and sulfonic acid alkyl ester groups. Other contemplated sulfonation reagents include, but are not limited to, those derived from the reaction or complexation of sulfur trioxide with phosphous pentoxide, polyphosphoric acid, 1,4-dioxane, triethylamine, etc.

The presently described technology and its advantages will be better understood by reference to the following examples. These examples are provided to describe specific embodiments of the present technology. By providing these specific examples, the applicants do not limit the scope and spirit of the present technology. It will be understood by those skilled in the art that the full scope of the presently described technology encompasses the subject matter defined by the claims appending this specification, and any alterations, modifications, or equivalents of those claims.

EXAMPLES

Example 1

Preparing a Styrene Block Copolymer Labeled SB-1 of the Structure (ptBS-EB-S)$_n$ A styrene block copolymer labeled SB-1 of the structure (ptBS-EB-S)$_n$, containing 42% styrene (S) and 43% para-tert-butylstyrene (i.e., p-t-butylstyrene or ptBS) by weight, was prepared in this example. In this (ptBS-EB-S)$_n$ polymer, EB-S was considered the interior block for calculating the styrene content in the interior block.

The SB-1 polymer is a selectively hydrogenated (A-D-B)$_n$X block copolymer where the A block is a polymer block of p-t-butylstyrene and the B block is a polymer block of unsubstituted styrene. The block labeled D is hydrogenated butadiene (EB) and X is a silicon containing residue of the coupling agent tetramethoxysilane.

In the preparation of SB-1, anionic polymerization of p-t-butylstyrene in cyclohexane was initiated using s-butyl-lithium (s-BuLi) affording an A block having an estimated molecular weight of about 22,000 g/mol. A portion of this solution was transferred to a second reactor containing cyclohexane, diethylether and butadiene, and polymerization was allowed to proceed to afford a second segment with a molecular weight of 28,000 g/mol (ptBS-Bd-Li). The polybutadiene segment had a 1,2-addition content of about 40 wt %. The living (ptBS-Bd-Li) diblock copolymer solution was treated with styrene monomer to produce a living triblock copolymer (ptBS-Bd-S—Li) having a third block composed only of polystyrene (S block MW=25,000 g/mol). The living polymer solution was coupled using tetramethoxysilane (about Si/Li=0.41/1 (mol/mol)) as the coupling agent. A mixture of branched ((ptBS-Bd-S)$_3$) (major component) and linear ((ptBS-Bd-S)$_2$) coupled polymers was obtained.

Hydrogenation using a standard Co2+/triethylaluminum method removed the C=C unsaturation in the butadiene portion of the pentablock copolymer affording the desired (A-D-B)$_n$X block copolymer, which was a mixture of branched ((ptBS-EB-S)$_3$) (major component) and linear ((ptBS-EB-S)$_2$) coupled polymers, was obtained. As the interior segment of this polymers contained only polystyrene and the end segments contained only poly-p-t-butylstyrene, the interior segments of these polymers were much more susceptible to sulfonation than were the end segments. The hydrogenated Bd segment, an EB polymer block, was sulfonation resistant and acted as a toughening spacer block between the poly-p-t-butylstyrene end segments and the sulfonated polystyrene center segment.

The molecular weight (MW) of the linear triblock component (2-arm for the coupled polymer) of the SB-1 product mixture as measured by gel permeation chromatography (GPC) (calibrated with polystyrene) was about 140 kg/mol. This molecular weight can be referred to as the "Apparent MWs 2-arm" (kg/mol) of SB-1. This Apparent MW was adjusted to estimate the actual MW of the SB-1 triblock copolymer using the following factors (adjusted based upon the MW of the monomer) to adjust the polystyrene equivalent molecular weight to true MW values: for polystyrene (S), multiply the apparent MW by wt % polystyrene times 1.0; for hydrogenated polybutadiene (EB), multiply the apparent MW by wt % hydrogenated polybutadiene times 0.54; and for ptBS, multiply the apparent MW by wt % poly-para-tert-butylstyrene times 1.6. The actual molecular weight of the linear triblock component of the SB-1 product mixture, which can be referred to as "Mn(true) 2-arm" (kg/mol) was about 156 kg/mol.

The SB-1 polymer contains about 42 wt % polystyrene, about 43 wt % poly-p-t-butylstyrene, and about 15 wt % hydrogenated polybutadiene (EB). The styrene content in the interior block EB-S is about 73 wt %.

Example 2

Sulfonating Isolated Styrene Block Copolymer SB-1

This example demonstrates a method of sulfonating the styrenic block copolymer labeled SB-1 in cyclohexane solvent, utilizing isobutyryl sulfate as the sulfonation reagent. The SB-1 polymer used in this example was dry polymer crumb or powder that was isolated by washing the hydrogenated polymer solution prepared in Example 1 to remove the catalyst, steam stripping of solvent, and drying in a forced air oven. The dry polymer crumb so obtained was further dried in a 90° C. vacuum oven for approximately 2 hours before use in this example.

About 10.0 g of the isolated styrene block copolymer SB-1 and about 190 g of cyclohexane were added to a 500 mL four-neck round bottom flask equipped with an overhead mechanical stirrer, a drying tube filled with $Ca(SO_4)_2$, a stopper, and a thermocouple. The mixture was heated with 250 RPM stirring to about 50° C. until the polymer was dissolved to produce a polymer solution containing about 5% by weight of the SB-1 polymer. The 5% polymer solution was then cooled to about 30° C.

About 5.90 g (0.037 moles) of isobutyric anhydride was added to this 5% polymer solution, followed by the addition of about 2.96 g (0.029 moles) of reagent grade sulfuric acid (about 95 wt % concentration, the remainder comprised of water). The reaction mixture was stirred for approximately 1 hour at about 30° C. and was then heated to about 50° C. for an additional 5 hours. Throughout the course of the reaction, the mixture remained free of polymer precipitation, was low in viscosity, and was free of any visual signs of gelation. Upon cooling, the reaction product obtained was a deep-gray, low viscosity liquid with a slight blue partially opaque appearance and was free of any visual signs of gelation.

About two (2) grams of this product was treated with several drops of methanol and was stripped off solvent by drying in a 50° C. vacuum oven for approximately 0.5 hours. A 30 mg sample of the dried polymer was dissolved in about 0.75 mL of tetrahydrofuran-d8 (THF-d8), to which was then added with a partial drop of concentrated $H_2SO_4$ to shift interfering labile proton signals downfield away from aromatic proton signals in subsequent NMR analysis. The resulting solution was analyzed by $^1H$ NMR at about 63° C. The percentage styrene sulfonation was calculated from the integration of $^1H$ NMR signal at about 7.6 part per million (ppm), which corresponded to one-half of the aromatic protons on sulfonated styrene units; the signals corresponding to the other half of such aromatic protons were overlapped with the signals corresponding to unsulfonated styrene aromatic protons and t-butylstyrene aromatic protons. The NMR analysis indicated that 58 mol % of styrene repeat units that are susceptible to sulfonation had been sulfonated.

The reaction product was further analyzed by two separate titrations (the "two-titration method") to determine the levels of styrenic polymer sulfonic acid, sulfuric acid, and non-polymeric by-product sulfonic acid (2-sulfoisobutyric acid). For each titration, an aliquot of about five (5) grams of the reaction product solution was dissolved in about 100 mL of tetrahydrofuran and about 2 mL of water and about 2 mL of methanol were added. In the first titration, the solution was titrated potentiometrically with 0.1 N cyclohexylamine in methanol to afford two endpoints; the first endpoint corresponded to all sulfonic acid groups in the sample plus the first acidic proton of sulfuric acid, and the second endpoint corresponded to the second acidic proton of sulfuric acid. In the second titration, the solution was titrated potentiometrically with 0.14 N sodium hydroxide in about 3.5:1 methanol:water to afford three endpoints: The first endpoint corresponded to all sulfonic acid groups in the sample plus the first and second acidic proton of sulfuric acid; the second endpoint corresponded to the carboxylic acid of 2-sulfoisobutyric acid; and the third endpoint corresponded to isobutyric acid.

The selective detection the of the second acidic proton of sulfuric acid in the first titration, together with the selective detection of the carboxylic acid of 2-sulfoisobutyric acid in the second titration, allowed for the calculation of acid component concentrations with the following results: about 0.1085 mmol/g polymer sulfonic acid, about 0.0142 mmol/g sulfuric acid, about 0.0094 mmol/g 2-sulfoisobutyric acid, and about 0.3368 mmol/g isobutyric acid. Based on mass balance, the degree of styrene sulfonation was calculated to be about 56 mol %, which is in excellent agreement with the $^1H$ NMR analysis results as noted above, and corresponds to 1.92 milliequivalents of sulfonic acid per gram of sulfonated polymer (1.92 meq/g). The by-product acid component levels were calculated to be present at the following weight percentages on a 100% solids sulfonated polymer basis: about 2.5% sulfuric acid, about 2.5% 2-sulfoisobutyric acid, and about 52.5% isobutyric acid.

The excellent fluidity of the reaction product was demonstrated at about 20° C. utilizing a simple screening method. The reaction product was added to a standard Ford Cup equipped with a #5 orifice (Paul N. Gardner Co., Inc., Pompano Beach, Fla., 69 Years Anniversary Catalog, pp. 1382-1390, item VI-333, #5 orifice), maintained level in a support stand, and with the bottom orifice sealed with a gloved finger, until the cup was completely filled. A glass plate was then applied to the top of the cup, upon which a slight excess of reaction product was observed to overflow into the cup's overflow trough. A collection beaker was placed below the cup and then the finger was removed from the orifice. The glass plate was then removed from the top of the cup, upon which the liquid contents rapidly and essentially fully drained from the cup. The drainage time, defined as the time that had expired between removal of the glass plate and the time at which the top level of the fluid had dropped through the full vertical length of the cup, was about 7 seconds. No significant reaction product was retained in the cup other than a thin coating of liquid that wetted the walls of the device.

The reaction product, displaying a slight blue "colloidal" appearance, was further characterized by particle size analysis on a Malvern Zetasizer Nano Series dynamic light scattering instrument, model number ZEN3600, available from Malvern Instruments Limited, UK. Dilution of the reaction product by a factor of 10 with cyclohexane afforded a polymer solution of about 0.5-0.6 wt %, which was placed in a 1 cm acrylic cuvette and subjected to the instrument's general purpose algorithm for determination of size distribution as a function of intensity. This algorithm afforded a particle size distribution in terms of mean hydrodynamic radius with a dominant peak at 230 nm, comprising 95.6% of the total intensity, a minor peak at 20 nm, comprising 1.5% of the total intensity, and a minor peak at 4000 nm, comprising 2.8% of the total intensity. The dominant peak at 230 nm is consistent with the depiction of the reaction product as being comprised of sulfonated polymer micelles and/or other polymer aggregates of definable size and distribution, as would be characteristic of polymer micelle structures.

A particle size analysis of the non-sulfonated precursor polymer SB-1 at 0.5 wt % in cyclohexane demonstrated a dominant peak at 20.6 nm, comprising 76.4% of the total intensity, a minor peak at 158 nm, comprising 22.6% of the total intensity, and a very minor peak at 5560 nm, comprising 1.0% of the total intensity. The dominant particle size in this profile is consistent with random-coil polymer chains in the solution. The presence of the minor peak at 158 nm for the precursor polymer in cyclohexane is consistent with a portion of the polymer chains in the solution being present as polymer aggregates.

Comparative Example A

This example demonstrates that the use of the halogenated solvent 1,2-dichloroethane is inferior to the use of cyclohexane in a sulfonation reaction that is otherwise comparable to that of Example 2.

A solution of about 10.0 g of the dry and isolated styrene block copolymer SB-1 as prepared in Example 2 and about 190 g of 1,2-dichloroethane was added to a 500 mL four-neck round bottom flask equipped with an overhead mechanical stirrer, a drying tube filled with $Ca(SO_4)_2$, a stopper, and a thermocouple was added. The 5% polymer solution was heated with 250 RPM stirring to about 30° C. About 5.90 g (0.037 moles) of isobutyric anhydride was added to this solution, followed by 2.96 g (0.029 moles) of a reagent grade sulfuric acid (about 95 wt % concentration). The reaction mixture was stirred for approximately 1 hour at about 30° C. and was then heated to about 50° C. for an additional approximately 9.5 hours. Upon cooling to room temperature, a two-gram aliquot of this product was treated with several drops of methanol, and was stripped of solvent by drying in a 50° C. vacuum oven for approximately 0.5 hours. The dried product was then dissolved in THF-d8, and was analyzed by $^1$H NMR at 63° C. This analysis indicated that only about 35 mol % of styrene repeat units had been sulfonated, indicating that even with a substantially longer reaction time, the reaction of isobutyryl sulfate with the polymer in 1,2-dichloroethane was less effective in sulfonating the precursor polymer as compared to Example 2.

Comparative Examples B Through F

Examples B-F demonstrate that sulfonation of polystyrene in cyclohexane with $C_4$ acyl sulfates results in polymer precipitation at comparatively low degrees of sulfonic acid incorporation.

For each example summarized in Table 1, a desired amount of polystyrene (typical $M_n$=140,000; typical $M_w$=230,000, Tg=94.0° C., melt index 6.00-9.00 g/10 min. at 200° C./5.0 kg per ASTM D-1238, Aldrich catalog #430102-1KG, available from Sigma-Aldrich Fine Chemicals, Milwaukee, Wis.) was dissolved in cyclohexane at about 50-70° C. in a 500 mL four-neck round bottom flask equipped with an overhead mechanical stirrer, a drying tube filled with $Ca(SO_4)_2$, a stopper, and a thermocouple. A desired amount of n-butyric or isobutyric anhydride was then added to each polymer solution at about 50° C., followed by a desired amount of a reagent grade sulfuric acid. In each example, the molar ratio of anhydride to sulfuric acid was about 1.3 to 1 and the molar ratio of sulfuric acid to polymer styrene repeat units was about 0.3 to 1.

TABLE 1

|  | Example B | Example C | Example D | Example E | Example F |
|---|---|---|---|---|---|
| Mass polystyrene/g | 6.0 | 10.0 | 20.0 | 30.0 | 10.0 |
| Mass cyclohexane/g | 194 | 190 | 180 | 120 | 190 |
| Concentration of polystyrene in cyclohexane (wt %) | 3.0 | 5.0 | 10.0 | 20.0 | 5.0 |
| Anhydride | n-butyric | n-butyric | n-butyric | n-butyric | isobutyric |
| Mass anhydride/g | 3.54 | 5.90 | 11.81 | 17.71 | 5.90 |
| Mass conc. $H_2SO_4$/g | 1.78 | 2.96 | 5.93 | 8.89 | 2.96 |
| Initial concentration of polystyrene in reaction mixture | 2.92 | 4.79 | 9.19 | 16.99 | 4.79 |
| Reaction time at which deposition of precipitated polymer was noted | 60 minutes | 50 minutes | 50 minutes | 45 minutes | 15 minutes |
| mol % styrene sulfonation[a] ($^1$H NMR) | 4.78 | 4.68 | 5.39 | 6.81 | 4.61 |
| meq/g polymer sulfonic acid in reaction product[b] | 0.443 | 0.434 | 0.497 | 0.621 | 0.427 |

[a]Analysis of quenched sample upon noting deposition of precipitated polymer.
[b]Calculated from mol % styrene unit sulfonation.

The reaction mixtures were stirred at about 50° C. until polymer precipitation occurred, which first became apparent by the deposition of gummy polymer deposits on the surface of the reaction flask just above the reaction mixture liquid level. At these points in the reactions, approximately 4 gram aliquots of the reaction mixtures were removed and quenched with several milliliters (mL) of isopropyl alcohol. Upon drying, samples from these products were analyzed by $^1$H NMR to determine the degree of styrene unit sulfonation at which polymer precipitation had commenced in each of the examples. In each example, the reaction was continued for approximately 10 minutes beyond the initial display of polymer precipitation, and then the reaction mixture was transferred to a storage jar. In each example, the polymer Without being bound by any particular theory, it is believed that the improved degree of polymer sulfonation with $C_4$ and higher acyl sulfates relative to propionyl and, in particular, acetyl sulfate is attributable to better solubility of $C_4$ and higher acyl sulfates in cyclohexane and reduced 2-sulfocarboxylic acid by-product formation. As the results in Table 2 show, by-product 2-sulfocarboxylic acid formation is particularly reduced for Example 2, in which the reaction was conducted with isobutyryl sulfate.

TABLE 2

|  | Example 2 | Example 3 | Example 4 | Example 5 | Example 6 |
| --- | --- | --- | --- | --- | --- |
| Anhydride | Isobutyric | Acetic | Propionic | Valeric | Caprylic |
| Physical state of reaction product | Low viscosity liquid | Low viscosity liquid; by-product acid separates as heavy liquid | Low viscosity liquid; by-product acid separates as sludge | Low viscosity liquid | Low viscosity liquid |
| meq/g polymer sulfonic acid in reaction product | 0.1085 | 0.0212 | 0.0608 | 0.0862 | 0.0845 |
| meq/g $H_2SO_4$ in reaction product | 0.0142 | 0.0490 | 0.0163 | 0.0120 | 0.0114 |
| meq/g 2-sulfocarboxylic acid in reaction product | 0.0094 | 0.0774 | 0.0550 | 0.0358 | 0.0349 |
| Mol % styrene sulfonation | 56.2 | 11.9 | 28.6 | 44.9 | 44.7 |
| meq polymer sulfonic acid per gram sulfonated polymer | 1.92 | 0.42 | 1.15 | 1.58 | 1.57 |
| Drainage time through Ford Cup (seconds) | 7 | 5 | 6 | 7 | 7 |
| Mean particle size upon 10X dilution | 200 nm (92%) 24.2 nm (5%) 4800 nm (3%) | 180 nm (79%) 22.9 nm (21%) | 256 nm (100%) | 210 nm (100%) | 151 nm (97%) 16.8 nm (3%) | collected at the bottom of the storage jar as a sticky, rubbery mass that was obviously precipitated from transparent solvent. The results in Table 1 clearly demonstrate that even at low degree of sulfonic acid incorporation, polystyrene was precipitated from the reaction mixture, regardless of the polymer concentration at which the reaction was conducted.

Examples 3-6

Examples 3-6 demonstrated the effect of different acyl sulfate reagent compositions on the sulfonation of the styrenic block copolymer SB-1 in cyclohexane solvent. The styrenic block copolymer SB-1 used in these examples was prepared in Example 1, and isolated, washed, and dried as described in Example 2.

For each example, about 10 grams of the isolated precursor polymer SB-1 was dissolved in about 190 grams of cyclohexane and sulfonated under conditions comparable to those described in Example 2. For each reaction, the molar ratio of anhydride to sulfuric acid was about 1.30 and the molar ratio of sulfuric acid to polymer styrene repeat units was about 0.712. At the end of each reaction, the sulfonated polymer in cyclohexane was analyzed by the two-titration method as described in Example 2. Reaction products were also characterized in terms of fluidity by means of flow through a Ford Cup with a #5 orifice and in terms of particle size by means of dynamic light scattering, both types of characterization being conducted as described in Example 2. Results of these examples are summarized in Table 2 together with the results from Example 2.

Example 7

This example demonstrates the sulfonation of unwashed styrene block copolymer labeled SB-2, which has the same structure and block characteristics as SB-1 prepared in Example 1, in cyclohexane.

The SB-2 polymer with the structure (ptBS-EB-S)$_n$ was prepared using the same method as described in Example 1 except that about 110 PPM of 1,2-diethoxypropane, instead of diethyl ether, was used to achieve the desired 1,2-addition content of about 40 wt %. Unlike the isolated SB-1 used in Examples 2-6 and Comparative Example A above, there was no prior isolation or clean-up of the polymer SB-2 from the previous hydrogenation step of producing the polymer before the polymer SB-2 was sulfonated in this example.

About 63.9 g of the polymer hydrogenation product, which comprised about 15.65 wt % of the styrene block copolymer SB-2 in cyclohexane were added to a 500 mL four-neck round bottom flask equipped with an overhead mechanical stirrer, a drying tube filled with Ca(SO$_4$)$_2$, a stopper, and a thermocouple. About 136.1 g of cyclohexane was then added to this mixture to afford a polymer solution comprising about 5% of the SB-2 polymer. The solution was heated to about 30° C., and then about 8.63 g (0.0545 moles) of isobutyric anhydride was added to the solution, followed by about 2.96 g (0.042 moles) of a reagent grade sulfuric acid (about 95% concentration).

The reaction mixture was stirred for approximately 1 hour at about 30° C. and was then heated to about 50° C. for an additional approximately 5 hours. Upon cooling, a dark brown, low viscosity liquid with a slight blue opaque appearance and absent of any visual signs of gelation was obtained. A small amount of solid 2-sulfo isobutyric acid was observed to settle from the reaction product upon standing. The reaction product was analyzed by the two-titration method as described in Example 2 with the following results: about 0.1443 mmol/g polymer sulfonic acid, about 0.0214 mmol/g sulfuric acid, about 0.0199 mmol/g 2-sulfoisobutyric acid, and about 0.463 mmol/g isobutyric acid. Calculated based on the mass balance, the degree of styrene sulfonation was about 76.2 mol %, which corresponds to about 2.47 milliequivalents of sulfonic acid per gram of sulfonated polymer.

The reaction product was characterized in terms of fluidity by means of flow through a Ford Cup with a #5 orifice as described in Example 2. The drainage time was about 6 seconds. No significant reaction product was retained in the cup other than a thin coating of liquid that wetted the walls of the device. The reaction product displayed a particle size distribution with a dominant peak at 150 nm, comprising 97.4% of the total intensity, and a minor peak at 4310 nm, comprising 2.6% of the total intensity, as measured by dynamic light scattering.

A particle size analysis of the non-sulfonated, non-isolated precursor polymer SB-2 at 0.5 wt % in cyclohexane demonstrated a dominant peak at 25.5 nm, comprising 95.5% of the total intensity, and a very minor peak at 3700 nm, comprising 4.5% of the total intensity. In contrast to the isolated precursor polymer SB-1, which was redissolved in cyclohexane as described in Example 2, the absence of a peak in the range of 70 to 200 nm is consistent with a substantial absence of pre-formed micelles in the precursor polymer SB-2 solution prior to sulfonation.

Examples 8-12

Examples 8-12 demonstrate the effect of polymer concentrations on the extent of gelation in the sulfonation of the styrenic block copolymer SB-1 of the structure (ptBS-EB-S)$_n$ prepared in Example 1 and then isolated and dried as described in Example 2, the sulfonation being conducted in cyclohexane solvent. More specifically, Examples 8 and 9 were conducted in accordance with presently described technology, while Examples 10, 11 and 12 are comparative examples, and were conducted not according to the presently described technology.

For each example, the reaction conditions and results are summarized in Table 3, a desired amount of the isolated styrene block copolymer SB-1 was dissolved in cyclohexane in a 500 mL four-neck round bottom flask equipped with an overhead mechanical stirrer, a drying tube filled with $Ca(SO_4)_2$, a stopper, and a thermocouple. A desired amount of isobutyric anhydride was then added to each polymer solution with stirring at about 30° C., followed by the addition of a reagent grade sulfuric acid. In each example, the molar ratio of isobutyric anhydride to sulfuric acid was about 1.3 to 1 and the ratio of sulfuric acid to polymer styrene repeat units was about 0.712. For each example, the reaction mixture was stirred at about 30° C. for approximately 1 hour and then at about 50° C. for approximately 5 hours, except for the examples in which severe gelation occurred, where the reaction was discontinued when stirring of the reaction mass became ineffective and was accompanied by an obvious rising mass of reaction mixture upward along the axis of the mechanical stirrer shaft.

At the termination of each reaction, aliquots of the sulfonated polymers in cyclohexane were quenched and analyzed by the two-titration method as described in Example 2. The reaction products were also characterized in terms of fluidity by means of flow through a Ford Cup with a #5 orifice as described in Example 2, both immediately upon removal from the reaction flask at 50° C., and upon standing at room temperature (22±3° C.).

TABLE 3

|  | Example 8 | Example 9 | Example 10 | Example 11 | Example 12 |
| --- | --- | --- | --- | --- | --- |
| Mass polymer | 11.0 | 12.0 | 13.0 | 14.0 | 15.0 |
| Mass cyclohexane | 189 | 188 | 187 | 186 | 185 |
| Concentration of polymer in cyclohexane (wt %) | 5.5 | 6.0 | 6.5 | 7.0 | 7.5 |
| Mass isobutyric anhydride | 6.49 | 7.09 | 7.68 | 8.27 | 8.86 |
| Mass conc. $H_2SO_4$ | 3.26 | 3.56 | 3.85 | 4.15 | 4.45 |
| Initial concentration of polymer in reaction mixture (wt %) | 5.24 | 5.70 | 6.15 | 6.59 | 7.03 |
| Reaction time at 50° C. upon which reaction was discontinued (minutes) | 300 | 300 | 65 | 37 | 30 |
| Physical state of reaction product at 50° C. at time of discontinuation | Low viscosity liquid, free of gel | Slightly gelled mass that was effectively stirred throughout the reaction | Gelled mass that rose vertically on rotating stir shaft | Highly gelled mass that was not effectively stirred and that strongly rose vertically on rotating stir shaft | Highly gelled mass that was not effectively stirred and that strongly rose vertically on rotating stir shaft |
| meq/g polymer sulfonic acid in reaction product | 0.1133 | 0.1226 | 0.0972 | 0.0790 | 0.0695 |
| mol % styrene unit sulfonation | 45.7 | 49.5 | 39.2 | 29.7 | 23.2 |
| meq polymer sulfonic acid per gram sulfonated polymer | 1.61 | 1.72 | 1.40 | 1.09 | 0.872 |
| Drainage time through Ford Cup at | 9 | 65 | >300 (intermittent, | >300 (intermittent, | >300 (intermittent, |

TABLE 3-continued

|  | Example 8 | Example 9 | Example 10 | Example 11 | Example 12 |
|---|---|---|---|---|---|
| approximately 50° C. (seconds) |  |  | incomplete drainage) | incomplete drainage) | incomplete drainage) |
| Drainage time through Ford Cup at approximately 22 ± 3° C. (seconds) | 11 | 89 | Extremely slow flow: >10% drainage after 300 seconds | No flow through orifice | No flow through orifice |

Examples 13-17

Examples 13-17 demonstrate the sulfonation of styrenic block copolymers of varying structures in non-halogenated aliphatic solvents. The sulfonation reactions in these examples are summarized in Table 4.

Examples 13 and 14 are for a block copolymer labeled SB-3 with the structure (ptBS-S/EB-S)$_n$, at 3 wt % and 5 wt % concentration in cyclohexane. Examples 15 and 16 are for a block copolymer labeled SB-4 with the structure (ptBS-S)$_n$, in cyclohexane and methylcyclohexane. Example 17 is for a block copolymer labeled SB-5 with the structure (ptBS-S/EB)$_n$.

The (ptBS-S/EB-S)$_n$ block copolymer labeled SB-3 contains about 53 wt % total styrene, which was copolymerized with butadiene as a controlled-distribution block and then hydrogenated as described in U.S. Published Patent Application No. 2003/0176582. The block polymer SB-3 contains about 19% p-tert-butylstyrene by weight In the preparation of SB-3, anionic polymerization of p-t-butylstyrene in cyclohexane was initiated using s-butyllithium (s-BuLi) affording an A block having an estimated molecular weight of about 10,700 g/mol. A portion of this solution was transferred to a second reactor containing cyclohexane, diethylether, styrene and about 10% of the butadiene charge. Following the transfer, the remainder of the butadiene was added over about a 30 minute interval at about 55° C., and then polymerization was allowed to proceed to afford a second segment (Bd/S) with a molecular weight of about 29,000 g/mol (ptBS-Bd/S—Li). The polybutadiene segment had a 1,2-addition content of about 40 wt %; the copolymer segment had a polystyrene content of about 40% wt. The living (ptBS-Bd/S—Li) diblock copolymer solution was then treated with styrene monomer, to produce a living triblock copolymer (ptBS-Bd/S—S—Li) having a third block composed only of polystyrene (S block MW=21,000 g/mol). The living polymer solution was coupled using tetramethoxysilane. A mixture of branched ((ptBS-Bd-S)$_3$) (major component) and linear ((ptBS-Bd-S)$_2$) coupled polymers was obtained. This polymer SB-3 was then hydrogenated, isolated, washed, and dried, as described previously in Examples 1 and 2.

The (ptBS-S)$_n$ block copolymer labeled SB-4 is a (A-B)$_n$ X block copolymer where the A block is a polymer block of para-tert-butylstyrene (p-t-butylstyrene or ptBS) and the B block is a polymer block of unsubstituted styrene (S). This polymer, which does not require hydrogenation in order to ensure very low vinyl content, was not subjected to hydrogenation. In the preparation of the SB-4 polymer, anionic polymerization of p-t-butylstyrene in cyclohexane was initiated using s-BuLi affording an A block having an estimated molecular weight of about 26,000 g/mol. The solution of living poly-p-t-butylstyrene in cyclohexane was treated with styrene monomer. The ensuing polymerization gave a living diblock copolymer having a B block composed only of polystyrene, and a p-t-butylstyrene content of about 32 wt %. The living polymer solution was coupled using tetramethoxysilane (Si/Li=0.40/1 (mol/mol)). A mixture of branched (major component) and linear coupled polymers was obtained. The mixture was labeled SB-4. As the interior segments of these polymers contained only polystyrene and the end segments contained only poly-p-t-butylstyrene, the interior segments of these polymers were much more susceptible to sulfonation than were the end segments.

The SB-4 polymer contains about 68 wt % polystyrene and about 32 wt % poly-p-t-butylstyrene. The SB-4 polymer was isolated by steam stripping of solvent and was dried as described in Example 2.

The (ptBS-S/EB)$_n$ block copolymer labeled SB-5 contains about 31% wt styrene and 38% wt p-t-butylstyrene.

The SB-5 polymer is a selectively hydrogenated (A-B)$_n$X block copolymer where the A block is a polymer block of para-tert-butylstyrene (p-t-butylstyrene or ptBS) which was found to be resistant to sulfonation and the B block is an hydrogenated controlled-distribution block of butadiene and styrene (S/EB) which was found to be susceptible to sulfonation. The A block was prepared by anionic polymerization of p-t-butylstyrene (ptBS) in cyclohexane using s-BuLi as the initiator. A controlled-distribution SB copolymer segment was polymerized as described above for SB-3. The resulting ptBS-SB-Li polymer had a ptBS block MW of about 23,000 g/mole, and an S/Bd segment MW of about 72,000 g/mole. The polybutadiene segment had a 1,2-addition content of about 40 wt %; the copolymer segment had a polystyrene content of about 50% wt. The resulting diblock copolymer was coupled using methyl trimethoxysilane (Si/Li=0.45/1 (mol/mol)). The coupled polymer was a mostly linear A-B-A triblock copolymer. This polymer was then hydrogenated and recovered from the solvent as described previously in Examples 1 and 2.

For each of Examples 13 and 14, the SB-3 polymer was dissolved in cyclohexane, treated with isobutyric anhydride and sulfuric acid at about 30° C. for approximately 1 hour, and subsequently reacted at about 50° C. for approximately 5 hours in reactions comparable to that described in Example 2. Dynamic light scattering analysis of the reaction product in Example 13 was not obtained because the 10-fold dilution in cyclohexane afforded a mixture that was opaque and comprised of small gel particles.

For Example 15, the SB-4 polymer was dissolved in cyclohexane at about 50° C., and then isobutyric anhydride was added to this polymer solution, followed by the addition of concentrated sulfuric acid (about 95 wt %). The reaction mixture was stirred at about 50° C. for approximately 5.5 hours.

For Example 16, the SB-4 polymer was dissolved in methylcyclohexane at about 50° C. In a separate reaction flask, isobutyric anhydride was cooled to below 10° C., and concentrated sulfuric acid (approximately 95 wt %) was added dropwise with stirring, maintaining the reaction mixture temperature below 16° C. Upon completing the addition of the sulfuric acid, the isobutyryl sulfate obtained was allowed to warm to room temperature. The isobutyryl sulfate was then added to the methylcyclohexane solution of the SB-4 polymer at about 50° C., and was subsequently reacted with the SB-4 polymer at about 50° C. for approximately 5 hours.

For Example 17, the isolated SB-5 polymer was dissolved in cyclohexane, treated with isobutyric anhydride and sulfuric acid at 30° C. for approximately 1 hour, and subsequently reacted at about 50° C. for approximately 5 hours in a reaction comparable to that described in Example 2.

At the end of each reaction for Examples 13 through 17, the sulfonated polymer product in cyclohexane or methylcyclohexane was analyzed and characterized as described in Example 2. The reaction conditions and results for Examples 13-17 are summarized in Table 4.

The polymer SB-6 has the same overall structure as SB-1, except a longer EB segment. This polymer was prepared using the same method as described in Example 1, resulting in a (ptBS-EB-S)$_n$ block polymer comprised of about 33 wt % styrene and about 34 wt % p-t-butylstyrene, with a p-t-BS block MW of about 22,000 g/mole, an EB segment MW of about 18,000 g/mole, and an overall molecular weight (for the linear coupled polymer) of about 170,000 g/mole. The polymer was isolated as a dry crumb and/or powder as described in Example 2 prior to sulfonation.

The dry SB-6 polymer was dissolved in cyclohexane, treated with isobutyric anhydride and sulfuric acid at about 30° C. for approximately 1 hour, and subsequently reacted at about 50° C. for approximately 5 hours in a reaction comparable to that described in Examples 8-12. The molar ratio of isobutyric anhydride to sulfuric acid was about 1.3 to 1, and the ratio of sulfuric acid to polymer styrene repeat

TABLE 4

|  | Example 13 | Example 14 | Example 15 | Example 16 | Example 17 |
| --- | --- | --- | --- | --- | --- |
| Polymer structure | (ptBS-S/EB-S)n | (ptBS-S/EB-S)n | (ptBS-S)n | (ptBS-S)n | (ptBS-S/EB)n |
| Total styrene content (wt %) | 53 | 53 | 68 | 68 | 31 |
| p-tert-butylstyrene content (wt %) | 19 | 19 | 32 | 32 | 38 |
| Apparent MW$_S$ 2-arm (kg/mol) | 144 | 144 | 174 | 174 | 204 |
| M$_n$ (true) 2-arm (kg/mol) | 123 | 123 | 212 | 212 | 190 |
| Solvent | cyclohexane | cyclohexane | cyclohexane | methyl cyclohexane | cyclohexane |
| Molar ratio isobutyric anhydride to H$_2$SO$_4$ | 1.30 | 1.30 | 1.30 | 1.30 | 1.30 |
| Molar ratio H$_2$SO$_4$ to styrene repeat units | 0.613 | 0.613 | 0.80 | 1.00 | 0.684 |
| Initial concentration of polymer in reaction mixture (wt %) | 4.78 | 2.92 | 7.09 | 6.89 | 2.94 |
| Physical State of Reaction Product | Loosely gelled solution, free flowing. | Low viscosity liquid free of gel | Low viscosity liquid free of gel | Low viscosity liquid free of gel | Slightly viscous liquid, free of gel |
| Drainage time through Ford Cup at approximately 22 ± 3° C. (seconds) | 210 | 5 | 6 | 4 | 7 |
| mol % styrene sulfonation | 44.7 | 42.4 | 66.4 | 80.0 | 22.9 |
| meq polymer sulfonic acid per gram sulfonated polymer | 1.93 | 1.84 | 3.22 | 3.68 | 0.65 |
| Mean particle size upon 10X dilution of reaction product with an aliphatic solvent[a] |  | 193 nm (100%) | 131 nm (100%) | 62.2 nm (100%) | 213 nm (100%) |
| Mean particle size for 0.5 wt % precursor polymer in aliphatic solvent[a] |  | 24 nm (78%) 243 nm (18%) 4950 nm (3%) | 70.2 nm (100%) | 69.9 nm (100%) | 22 nm (34%) 201 nm (64%) 4790 nm (2%) |

[a]The aliphatic solvent used as the diluent for dynamic light scattering measurements was the same solvent as that used in the reaction.

Example 18

This example demonstrates that an increase in the length of the EB block in a block copolymer labeled SB-6 of the structure (ptBS-EB-S)$_n$ that is otherwise similar to the overall structure of polymer SB-1 results in an increased tendency towards gelation during the sulfonation of the polymer in cyclohexane solvent.

units was about 0.65. In an initial attempt, wherein the initial precursor polymer concentration in the reaction mixture was about 4.85 wt %, severe gelation of the reaction mixture occurred such that stirring of the reaction mass became ineffective and was accompanied by an obvious rising mass of reaction mixture upward along the axis of the mechanical stirrer shaft. The approximate degree of styrene sulfonation at the time in which this severe gelation had occurred was about 24 mol % of styrene units.

In a second reaction, wherein the initial precursor polymer concentration in the reaction mixture was about 2.94 wt %, the reaction remained easily stirred over the course of 8 hours at 50° C. The product of the second reaction was very fluid but displayed obvious visual indication of slight gelation. Titration analyses on the product were carried out as described in Example 2. Calculated from the titration results and mass balance, the degree of styrene sulfonation was about 44.3%, which corresponds to about 1.26 milliequivalents of sulfonic acid per gram of sulfonated polymer (1.26 meq/g).

Example 19

This example demonstrates the utility of an acyl sulfate prepared from a separate "pre-generation" reaction of oleum with isobutyric anhydride in the sulfonation of unwashed styrenic block copolymer SB-2 with the structure (ptBS-EB-S)$_n$.

In this example, isobutyryl sulfate was prepared from about 29.8 g (0.189 mol) of isobutyric anhydride by adding 25.0 g of 26% oleum (0.081 mol SO$_3$ and 0.189 mol H$_2$SO$_4$) dropwise over approximately 15 minutes while maintaining the reaction temperature below about 15° C. with an ice bath. About 5.84 g of this reagent was then added to a 30° C. stirred cyclohexane solution of the unwashed, non-isolated precursor styrenic copolymer SB-2 as described in Example 7, wherein the precursor polymer concentration in cyclohexane prior to addition of the acyl sulfate was about 5.0% by weight. The molar ratio of acyl sulfate to sulfonation-susceptible styrene units was about 0.7119, assuming that 100% of the SO$_3$ and sulfuric acid in the preparation of the isobutyryl sulfate reagent were converted to acyl sulfate.

After approximately 75 minutes of reaction at about 30° C., the reaction temperature was raised to about 50° C. for a total reaction time of approximately 5 hours. Throughout the course of the reaction, the mixture remained free of polymer precipitation, was low in viscosity, and was free of any visual signs of gelation. Upon cooling, the reaction product obtained was a dark brown, low viscosity liquid with a slight blue partially opaque appearance and free of any visual signs of gelation. Titration analyses were carried out as described in Example 2. Calculated from the titration results and mass balance, the degree of styrene sulfonation was about 44.3%, which corresponds to about 1.69 milliequivalents of sulfonic acid per gram of sulfonated polymer (1.69 meq/g). The by-product acid component levels were calculated to be present at the following weight percentages on a 100% solids sulfonated polymer basis: about 2.4% sulfuric acid, about 6.0% 2-sulfoisobutyric acid, and about 23.6% isobutyric acid. The reaction product displayed a particle size distribution with a dominant peak at 241 nm, comprising 92.2% of the total intensity, a minor peak at 20.7 nm, comprising 2.4% of the total intensity, and a minor peak at 4580 nm, comprising 5.4% of the total intensity, as measured by dynamic light scattering.

Example 20

This example demonstrates the evolution of particle size in a solution of the isolated styrenic block copolymer SB-1 with the structure (ptBS-EB-S)$_n$ during the course of sulfonation with isobutyryl sulfate in cyclohexane.

During the course of the reaction that was described in Example 8, changes in particle size distribution as measured by dynamic light scattering were followed over time. Aliquots of approximately 0.5 g were drawn from the reaction mixture, diluted by a factor of 10 with fresh cyclohexane, and then analyzed in 1 cm acrylic cuvettes in a Malvern Zetasizer Nano Series dynamic light scattering instrument, model number ZEN3600, utilizing the instrument's general purpose algorithm for determination of size distribution as a function of intensity. Results of the experiment are summarized in Table 5. At 60 minutes, the time in which the target reaction temperature was raised to 50° C., additional reaction mixture was removed, quenched with isopropyl alcohol, dried in a 50° C. vacuum oven for approximately half an hour, and analyzed by $^1$H NMR. At this 60 minutes time, the degree of sulfonation-susceptible styrene unit sulfonation was about 1 mol %.

The results show that the precursor polymer SB-1 in cyclohexane existed primarily in the form of random coil polymer chains (non-aggregated) with an average "size", i.e., hydrodynamic diameter, of around 20 nm, with a lesser amount of larger particles (about 80 nm) that may be attributable to minor amounts of aggregated polymer structures. Upon addition of the isobutyric anhydride and sulfuric acid, the polymer was gradually sulfonated at about 30° C., accompanied by an increase in the relative amount of larger particles of from about 100 nm to about 150 nm, attributable to the formation of polymer aggregates, i.e., micelles, and a concurrent decrease in the relative amount of small particles of about 20 nm. The reaction temperature was raised to about 50° C., whereupon sulfonation of the polymer proceeds more quickly. A complete depletion of the small particles attributable to monomeric polymer chains was observed, while the apparent particle size of the aggregated polymer structures grew to from about 200 nm to about 300 nm. Without being bound by any particular theory, it is believed that this increased size of the aggregated polymer structures may reflect an increase in the average number of polymer chains that are incorporated into discrete polymer micelles, and/or may reflect minor secondary aggregation, i.e., slight flocculation, of the discrete polymer micelles into larger particles.

TABLE 5

| | Particle size distribution as a function of intensity | | | | | | |
|---|---|---|---|---|---|---|---|
| Reaction Time/minutes | Peak 1 (nm) | Peak 1 % of total | Peak 2 (nm) | Peak 2 % of total | Peak 3 (nm) | Peak 3 % of total | Reaction Temp./° C. |
| 0.5% precursor polymer in cyclohexane | 19.3 | 76.9 | 79.6 | 5.9 | 244 | 17.2 | |
| 0 | 15.8 | 62.1 | 107 | 37.9 | | | 32.4 |
| 15 | 18 | 62.5 | 138 | 37.5 | | | 30.4 |
| 30 | 18.5 | 52.2 | 109 | 47.8 | | | 29.9 |
| 45 | 19.8 | 34.9 | 151 | 61.1 | 5280 | 4.0 | 30.6 |
| 60 | 16.3 | 20.1 | 98.4 | 79.9 | | | 29.8 |

TABLE 5-continued

Particle size distribution as a function of intensity

| Reaction Time/minutes | Peak 1 (nm) | Peak 1 % of total | Peak 2 (nm) | Peak 2 % of total | Peak 3 (nm) | Peak 3 % of total | Reaction Temp./° C. |
|---|---|---|---|---|---|---|---|
| 67 | 19.7 | 14.1 | 137 | 84.2 | 5400 | 1.6 | 37.3 |
| 70 | 20.3 | 9.7 | 133 | 90.3 | | | 43 |
| 75 | | | 167 | 100 | | | 50.8 |
| 90 | | | 221 | 100 | | | 50.3 |
| 120 | | | 205 | 96.6 | 4810 | 3.4 | 50.4 |
| 270 | 24.4 | 5.6 | 201 | 92.6 | 5560 | 1.7 | 50.2 |
| 360 | 10.1 | 0.6 | 272 | 94.5 | 4320 | 4.9 | 50.1 |

Example 21

This example demonstrate the utility of the addition of n-heptane to a cyclohexane solution of the unwashed styrenic block copolymer SB-2 to "pre-form" polymer micelles prior to the addition or in situ generation of a sulfonation reagent.

The styrene block copolymer labeled SB-2 of the structure (ptBS-EB-S)$_n$ was prepared as described in Example 7. The SB-2 polymer was not subjected to hydrogenation catalyst oxidation or extraction, nor was the polymer subjected to isolation from the cyclohexane solution in which it was prepared. The SB-2 polymer was obtained as a raw solution of about 15.65% by weight in cyclohexane. Solutions of the precursor polymer with a concentration of about 0.5 wt % were prepared by diluting this precursor polymer raw solution, which was in cyclohexane, with n-heptane in one sample, and with cyclohexane in another sample. Both of these two samples were then characterized by particle size analysis as described in Example 2.

The sample that was diluted with n-heptane displayed a single peak at a mean particle size diameter of about 94.4 nm. This particle size is consistent with essentially complete formation of polymer micelle structures and shows an absence of monomeric random-coil polymer chains. The sample that was diluted with cyclohexane displayed a dominant peak at 23.7 nm, comprising about 95.2% of the total intensity, and a minor peak at 4400 nm, comprising 4.8% of the total intensity. The dominant particle size in this profile is consistent with random-coil polymer chains in the solution. These results demonstrate that the addition of n-heptane to a cyclohexane solution of the precursor polymer induces polymer micelle formation.

Examples 22-25

These examples further demonstrate the utility of the addition of n-heptane to cyclohexane solutions of the unwashed SB-2 polymer prepared as described in Example 7 to "pre-form" polymer micelles, wherein higher solids processing was enabled.

For each example, the non-isolated styrene block copolymer SB-2 was used as the precursor polymer. In these reactions, the precursor polymer solution comprising about 15.65 wt % SB-2 in cyclohexane was diluted with a non-halogenated aliphatic solvent as indicated in Table 6. For each example, the reaction was conducted in a manner comparable to that of Example 7. In these reactions, the mole ratio of isobutyric anhydride to sulfuric acid was about 1.3 and the mole ratio of sulfuric acid to sulfonation-susceptible styrene units was about 0.7119. The results of these experiments are summarized in Table 6.

The results show that the reactions performed with n-heptane as the diluent achieved higher levels of styrene sulfonation in a shorter reaction time as compared to the reactions with cyclohexane as the diluent. In addition, the use of n-heptane in Example 25 enables the sulfonation of the polymer without disabling gelation at a polymer concentration that otherwise results in gelation when using cylcohexane as the diluent (Example 24).

TABLE 6

| | Example 22 | Example 23 | Example 24 | Example 25 |
|---|---|---|---|---|
| Diluent | cyclohexane | n-heptane | cyclohexane | n-heptane |
| Concentration of diluted precursor polymer prior to addition of anhydride and $H_2SO_4$ | 5.0 | 5.0 | 7.5 | 7.5 |
| Initial concentration of polymer in reaction mixture (wt %) | 4.79 | 4.79 | 7.03 | 7.03 |
| Reaction time at 50° C./hours | 5.0 | 4.0 | 0.5 | 4.0 |
| Physical State of Reaction Product | Low viscosity liquid free of gel | Very low viscosity liquid free of gel | Severely gelled, rubbery mass | Low viscosity liquid free of gel |
| Drainage time through Ford Cup at approximately 22 ± 3° C. (seconds) | 6 | 4 | No flow through orifice | 6 |
| % styrene sulfonation (by titration) | 54.9 | 54.5 | | 58.3 |
| Mean particle size upon 10X dilution with cyclohexane | 201 nm (95%) 4350 nm (5%) | 82 nm (100%) | | 146 nm (100%) |

Example 26

This example demonstrates the utility of the addition of n-heptane to cyclohexane solutions of isolated SB-1 polymer to "pre-form" polymer micelles, wherein the improved utility of propionyl sulfate is enabled as compared to the reaction described in Example 4.

For this example, the styrene block copolymer SB-1 prepared in Example 1 and isolated, washed, and dried as described in Example 2 was used as the precursor polymer. In this reaction the precursor polymer was first dissolved in cyclohexane to afford a polymer solution of about 15.65 wt %, which was then diluted with n-heptane as the additional diluent to afford a polymer solution of about 5.0 wt %. The sulfonation reaction was then conducted in a manner comparable to that of Example 4. In this reaction, the mol ratio of propionic anhydride to sulfuric acid was about 1.3 and the mol ratio of sulfuric acid to sulfonation-susceptible styrene units was about 0.7119. Upon cooling, the reaction product obtained was a purple, low viscosity liquid with a slight blue partially opaque appearance and free of any visible signs of gelation.

The reaction product was characterized in terms of fluidity by means of flow through a Ford Cup with a #5 orifice as described in Example 2. The drainage time was about 6 seconds. The reaction product displayed a particle size distribution with a peak at 163 nm, comprising 100% of the total intensity. Titration analyses were carried out as described in Example 2. Calculated from the titration results and mass balance, the degree of styrene sulfonation was about 51.2%, which corresponds to about 1.77 milliequivalents of sulfonic acid per gram of sulfonated polymer (1.77 meq/g). The reaction performed in this example with n-heptane as the additional diluent achieved substantially higher levels of styrene sulfonation as compared to the reaction of Example 4 that was conducted in cyclohexane alone.

Example 27

This example demonstrates the sulfonation of a 1:1 by weight mixture of the styrene block copolymer labeled SB-1 with the structure (ptBS-EB-S)$_n$ and the styrene block copolymer labeled SB-4 with the structure (ptBS-S)$_n$, conducted in cyclohexane solvent.

About 5.0 g of the styrene block copolymer SB-1 prepared in Example 1 and isolated and dried as described in Example 2, about 5.0 g of the styrene block copolymer SB-4 prepared in Examples 15 and 16, and about 190 g of cyclohexane were added to a 500 mL four-neck round bottom flask equipped with an overhead mechanical stirrer, a drying tube filled with Ca(SO$_4$)$_2$, a stopper, and a thermocouple. The mixture was heated with 250 RPM stirring to about 50° C. until the polymer was dissolved to produce a 5 wt % polymer solution. The 5 wt % polymer solution was then cooled to about 30° C.

About 7.73 g (0.049 moles) of isobutyric anhydride was then added to this 5 wt % polymer solution, followed by the addition of about 3.88 g (0.038 moles) of a reagent grade sulfuric acid (about 95 wt % concentration). The reaction mixture was stirred for approximately 1 hour at about 30° C. and was then heated to about 50° C. for an additional 5 hours. Throughout the course of the reaction, the mixture remained free of polymer precipitation, was low in viscosity, and was free of any visual signs of gelatin. Upon cooling, the reaction product obtained was a purple, low viscosity liquid with a grey partially opaque appearance and without any visual signs of gelation. Titration analyses were conducted as described in Example 2. The mol % styrene unit sulfonation was 54.8, which corresponds to 2.35 milliequivalents of sulfonic acid per gram of sulfonated polymer (2.35 meq/g).

The reaction product was characterized in terms of fluidity by means of flow through a Ford Cup with a #5 orifice as described in Example 2. The drainage time was about 5 seconds. The reaction product displayed a particle size distribution in terms of mean hydrodynamic radius with a dominant peak at 159 nm, comprising 100% of the total intensity as measured by dynamic light scattering.

Example 28

This example demonstrates the lack of solubility of dried sulfonated block copolymers in the same aliphatic solvent that had been used in the sulfonation reactions to produce them. The dried sulfonated block copolymers used in this example were obtained by sulfonation of precursor block copolymers in a non-halogenated aliphatic solvent with acyl sulfates. The polymers have been isolated and dried from the sulfonation reaction mixtures by evaporation of the solvent.

More specifically, the polymer solids were obtained from aliquots of sulfonation reaction product mixtures prepared as described in Examples 2, 14, 15, and 17. About 5 grams of each reaction mixture were dried by evaporation of the solvent at ambient conditions for about 20 hours. Portions of these polymer solids weighing about 50 mg each were then added to 4 dram vials containing about 5 g of cyclohexane. The vials were placed on a blood rocker for approximately 24 hours, and the degree of polymer solubility at room temperature was visually assessed. None of the polymer samples displayed any visual signs of dissolution, indicating that the isolated sulfonated block copolymers are insoluble in the same aliphatic solvent used in their preparation.

The present technology is now described in such full, clear, concise and exact terms as to enable any person skilled in the art to which it pertains, to practice the same. It is to be understood that the foregoing describes preferred embodiments of the invention and that modifications may be made therein without departing from the spirit or scope of the present technology as set forth in the appended claims.

What is claimed is:
1. A process for preparing sulfonated block polymers in non-halogenated aliphatic solvents, comprising the steps of:
   providing a precursor block polymer having at least one end block A and at least one interior block B wherein each A block is a polymer block resistant to sulfonation and each B block is a polymer block susceptible to sulfonation, wherein said A and B blocks are substantially free of olefinic unsaturation; and
   reacting the precursor block polymer with an acyl sulfate having an acyl group of from 3 to 8 carbon atoms, in a reaction mixture that comprises at least one non-halogenated aliphatic solvent and is substantially free of halogenated solvents, to form a sulfonated block polymer, wherein the initial concentration of the precursor block polymer is in the range of from about 0.1 wt % to a concentration that is below the limiting concentration of the precursor block polymer based on the total weight of the reaction mixture; wherein the sulfonation reaction is conducted in a manner that is substantially free of polymer precipitation and free of disabling gelation in the reaction mixture; and wherein the sulfonated block polymer has a degree of sulfonation greater than 0.8 milliequivalent sulfonic acid per gram sulfonated block polymer.

2. The process of claim 1, wherein the precursor block polymer has the general configuration of A-B-A, A-B-A-B-A, (A-B-A)nX, (A-B)nX, A-D-B-D-A, A-B-D-B-A, (A-D-B)nX, (A-B-D)nX, A-B-B-B-A, (A-B-B)nX, or a mixture thereof, where the plurality of A blocks, B blocks, or D blocks in the precursor block polymer are the same or different, where n is an integer from about 1 to about 30, X is a coupling agent residue, and each D block is a polymer block resistant to sulfonation and is substantially free of olefinic unsaturation.

3. The process of claim 1, wherein the precursor block polymer comprises between about 10 and about 60 mol percent A blocks.

4. The process of claim 1, wherein the initial concentration of the precursor block polymer is in the range of from about 1.0 wt % to a concentration that is about 0.1 wt % below the limiting concentration of the precursor block polymer based on the total weight of the reaction mixture.

5. The process of claim 2, wherein each A block independently has a number average molecular weight between 1,000 and 60,000, each D block independently having a number average molecular weight between 1,000 and 50,000, and each B block independently has a number average molecular weight between 10,000 and 300,000.

6. The process of claim 1, wherein each B block contains one or more sulfonic functional groups after sulfonation and each A block is essentially free of sulfonic functional groups after sulfonation.

7. The process of claim 1, wherein the sulfonated block polymer has a degree of sulfonation greater than about 1.0 milliequivalent sulfonic acid per gram sulfonated block polymer.

8. The process of claim 1, wherein the B blocks are sulfonated to the extent of from about 30 to about 100 mol percent, based on the units of sulfonation susceptible monomers in said B blocks.

9. The process of claim 1, wherein the at least one non-halogenated aliphatic solvent is cyclohexane, methylcyclohexane, cyclopentane, cycloheptane, cyclooctane, isopentane, n-hexane, isohexane, n-heptane, isoheptane, n-octane, isooctane, nonane, decane, undecane, dodecane, or a mixture thereof.

10. The process of claim 1, wherein the precursor block polymer comprises at least two polymer end blocks A and at least one polymer interior block B.

11. The process of claim 2, wherein each A block comprises one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content of less than 35 mol percent prior to hydrogenation, (vi) acrylic esters, (vii) methacrylic esters, (viii) derivatives thereof, and (ix) mixtures thereof, wherein any segments containing polymerized 1,3-cyclodiene or conjugated dienes are subsequently hydrogenated;
wherein each B block comprises polymers of one or more vinyl aromatic monomers selected from polymerized (i) unsubstituted styrene monomers, (ii) ortho-substituted styrene monomers, (iii) meta-substituted styrene monomers, (iv) alpha-methylstyrene, (v) 1,1-diphenylethylene, (vi) 1,2-diphenylethylene, (vii) derivatives thereof, and (viii) mixtures thereof; and
wherein each D block comprises polymers having a glass transition temperature less than 20° C. and a number average molecular weight of between 1000 and 50,000, said D block being selected from the group consisting of (i) a polymerized or copolymerized conjugated diene selected from isoprene, 1,3-butadiene having a vinyl content prior to hydrogenation of between 20 and 80 mol percent, (ii) a polymerized acrylate monomer, (iii) silicone polymer, (iv) polymerized isobutylene, (v) derivatives thereof, and (vi) mixtures thereof, wherein any segments containing polymerized 1,3-butadiene or isoprene are subsequently hydrogenated.

12. The process of claim 1, wherein the acyl sulfate is obtained in an in-situ reaction.

13. The process of claim 1, further comprising the step of forming micelles by reacting the precursor block polymer with the acyl sulfate in the reaction mixture.

14. A process for preparing sulfonated block polymers in non-halogenated aliphatic solvents, comprising the steps of:
(1) pre-forming micelles comprising a precursor block polymer prior to sulfonation by:
providing a precursor block polymer having at least one end block A and at least one interior block B wherein each A block is a polymer block resistant to sulfonation and each B block is a polymer block susceptible to sulfonation, wherein said A and B blocks are substantially free of olefinic unsaturation; and
mixing the precursor block polymer with at least one non-halogenated solvent to form the micelles comprising the precursor block polymer; and
(2) sulfonating at least some of the pre-formed micelles comprising the precursor block polymer with an acyl sulfate having an acyl group of from 3 to 8 carbon atoms, in a reaction mixture that is substantially free of halogenated solvents, to form a sulfonated block polymer, wherein the initial concentration of the precursor block polymer is in the range of from about 0.1 wt % to a concentration that is below the limiting concentration of the precursor block polymer based on the total weight of the reaction mixture; wherein the sulfonation reaction is conducted in a manner that is substantially free of polymer precipitation and free of disabling gelation in the reaction mixture, the product of the sulfonation step, or both; and wherein the sulfonated block polymer has a degree of sulfonation greater than 0.8 milliequivalent sulfonic acid per gram sulfonated block polymer.

15. The process of claim 14, wherein the non-halogenated aliphatic solvent is selected from the group consisting of cyclohexane, methylcyclohexane, cyclopentane, cycloheptane, cyclooctane, isopentane, n-hexane, isohexane, n-heptane, isoheptane, n-octane, isooctane, nonane, decane, undecane, dodecane, and mixtures thereof.

16. The process of claim 14, wherein the precursor block polymer is partially soluble in the non-halogenated aliphatic solvent.

17. The process of claim 14, wherein the initial concentration of the precursor block polymer is in the range of from about 1.0 wt % to a concentration that is about 0.1 wt % below the limiting concentration of the precursor block polymer based on the total weight of the reaction mixture.

18. The process of claim 14, wherein at least one B block is a hydrogenated copolymer block of at least one conjugated diene and at least one mono alkenyl arene selected from (i) unsubstituted styrene monomers, (ii) ortho-substituted styrene monomers, (iii) meta-substituted styrene monomers, (iv) alpha-methylstyrene, (v) 1,1-diphenylethylene, (vi) 1,2-diphenylethylene, (vii) derivatives thereof, and (viii) mixtures thereof.

19. The process of claim 14, wherein the B blocks are sulfonated to the extent of from about 30 to about 100 mol percent, based on the units of sulfonation susceptible monomers in said B blocks.

20. The process of claim 1, wherein the acyl group of the acyl sulfate has from 3 to 5 carbon atoms.

21. The process of claim 14, wherein the acyl group of the acyl sulfate has from 3 to 5 carbon atoms.

\* \* \* \* \*